(12) United States Patent
Lord et al.

(10) Patent No.: US 9,053,096 B2
(45) Date of Patent: Jun. 9, 2015

(54) LANGUAGE TRANSLATION BASED ON SPEAKER-RELATED INFORMATION

(75) Inventors: Richard T. Lord, Tacoma, WA (US); Robert W. Lord, Seattle, WA (US); Nathan P. Myhrvold, Medina, WA (US); Clarence T. Tegreene, Bellevue, WA (US); Roderick A. Hyde, Redmond, WA (US); Lowell L. Wood, Jr., Bellevue, WA (US); Muriel Y. Ishikawa, Livermore, CA (US); Victoria Y. H. Wood, Livermore, CA (US); Charles Whitmer, North Bend, WA (US); Paramvir Bahl, Bellevue, WA (US); Douglas C. Burger, Bellevue, WA (US); Ranveer Chandra, Kirkland, WA (US); William H. Gates, III, Medina, WA (US); Paul Holman, Seattle, WA (US); Jordin T. Kare, Seattle, WA (US); Craig J. Mundie, Seattle, WA (US); Tim Paek, Sammamish, WA (US); Desney S. Tan, Kirkland, WA (US); Lin Zhong, Houston, TX (US); Matthew G. Dyor, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 503 days.

(21) Appl. No.: 13/340,143

(22) Filed: Dec. 29, 2011

(65) Prior Publication Data
US 2013/0144595 A1   Jun. 6, 2013

Related U.S. Application Data

(63) Continuation-in-part of application No. 13/309,248, filed on Dec. 1, 2011, and a continuation-in-part of application No. 13/324,232, filed on Dec. 13, 2011.

(51) Int. Cl.
*G06F 17/28* (2006.01)
(52) U.S. Cl.
CPC .................................. *G06F 17/289* (2013.01)
(58) Field of Classification Search
CPC .............. G06F 17/289; G06F 17/2872; G06F 17/2827; G06F 17/2836; G06F 17/2818; G06F 17/2755; G06F 17/271; G06F 17/275; G06F 17/2735; G06F 17/277
USPC ........................ 704/2–10, 246, 247, 251, 252
See application file for complete search history.

(56) References Cited

U.S. PATENT DOCUMENTS

| 5,239,586 A | 8/1993 | Marui |
| 5,983,161 A | 11/1999 | Lemelson et al. |

(Continued)

OTHER PUBLICATIONS

U.S. Appl. No. 13/434,475, Lord et al.

(Continued)

*Primary Examiner* — Leonard Saint Cyr
(74) *Attorney, Agent, or Firm* — Benedict R. Dugan; Lowe Graham Jones PLLC

(57) ABSTRACT

Techniques for ability enhancement are described. Some embodiments provide an ability enhancement facilitator system ("AEFS") configured to automatically translate utterances from a first to a second language, based on speaker-related information determined from speaker utterances and/or other sources of information. In one embodiment, the AEFS receives data that represents an utterance of a speaker in a first language, the utterance obtained by a hearing device of the user, such as a hearing aid, smart phone, media player/device, or the like. The AEFS then determines speaker-related information associated with the identified speaker, such as by determining demographic information (e.g., gender, language, country/region of origin) and/or identifying information (e.g., name or title) of the speaker. The AEFS translates the utterance in the first language into a message in a second language, based on the determined speaker-related information. The AEFS then presents the message in the second language to the user.

48 Claims, 28 Drawing Sheets

(56) References Cited

U.S. PATENT DOCUMENTS

| | | | |
|---|---|---|---|
| 5,995,898 A | 11/1999 | Tuttle | |
| 6,157,727 A | 12/2000 | Rueda | |
| 6,226,389 B1 | 5/2001 | Lemelson et al. | |
| 6,304,648 B1 | 10/2001 | Chang | |
| 6,326,903 B1 | 12/2001 | Gross et al. | |
| 6,529,866 B1 | 3/2003 | Cope et al. | |
| 6,628,767 B1 | 9/2003 | Wellner et al. | |
| 6,731,202 B1 | 5/2004 | Klaus | |
| 6,944,474 B2 | 9/2005 | Rader et al. | |
| 7,224,981 B2 | 5/2007 | Deisher et al. | |
| 7,324,015 B1 | 1/2008 | Allen et al. | |
| 7,606,444 B1 | 10/2009 | Erol et al. | |
| 7,783,022 B1 | 8/2010 | Jay et al. | |
| 8,050,917 B2 | 11/2011 | Caspi et al. | |
| 8,369,184 B2 | 2/2013 | Calhoun | |
| 8,618,952 B2 | 12/2013 | Mochizuki | |
| 8,669,854 B2 | 3/2014 | D'Ambrosio et al. | |
| 2002/0021799 A1 | 2/2002 | Kaufholz | |
| 2003/0139881 A1 | 7/2003 | Miller et al. | |
| 2003/0158900 A1 | 8/2003 | Santos | |
| 2004/0064322 A1* | 4/2004 | Georgiopoulos et al. | 704/277 |
| 2004/0100868 A1 | 5/2004 | Patterson, Jr. et al. | |
| 2004/0122678 A1* | 6/2004 | Rousseau | 704/277 |
| 2004/0172252 A1 | 9/2004 | Aoki et al. | |
| 2004/0230651 A1 | 11/2004 | Ivashin | |
| 2004/0263610 A1 | 12/2004 | Whynot et al. | |
| 2005/0018828 A1 | 1/2005 | Nierhaus et al. | |
| 2005/0038648 A1 | 2/2005 | Ju et al. | |
| 2005/0041529 A1 | 2/2005 | Schliep et al. | |
| 2005/0088981 A1 | 4/2005 | Woodruff et al. | |
| 2005/0135583 A1 | 6/2005 | Kardos | |
| 2006/0080004 A1 | 4/2006 | Cheok et al. | |
| 2006/0195850 A1 | 8/2006 | Knight et al. | |
| 2008/0061958 A1 | 3/2008 | Birk et al. | |
| 2008/0195387 A1 | 8/2008 | Zigel et al. | |
| 2008/0270132 A1* | 10/2008 | Navratil et al. | 704/250 |
| 2008/0300777 A1 | 12/2008 | Fehr et al. | |
| 2009/0040037 A1 | 2/2009 | Schraga | |
| 2009/0070102 A1* | 3/2009 | Maegawa | 704/9 |
| 2009/0198735 A1* | 8/2009 | Yu et al. | 707/104.1 |
| 2009/0204620 A1 | 8/2009 | Thione et al. | |
| 2009/0271176 A1* | 10/2009 | Bodin et al. | 704/2 |
| 2009/0281789 A1* | 11/2009 | Waibel et al. | 704/3 |
| 2009/0282103 A1 | 11/2009 | Thakkar et al. | |
| 2009/0306957 A1* | 12/2009 | Gao et al. | 704/2 |
| 2009/0307616 A1 | 12/2009 | Nielsen | |
| 2010/0040217 A1 | 2/2010 | Aberg et al. | |
| 2010/0135478 A1* | 6/2010 | Wald et al. | 379/202.01 |
| 2010/0153497 A1 | 6/2010 | Sylvain et al. | |
| 2010/0185434 A1* | 7/2010 | Burvall et al. | 704/3 |
| 2010/0222098 A1 | 9/2010 | Garg | |
| 2010/0315218 A1 | 12/2010 | Cades et al. | |
| 2011/0010041 A1 | 1/2011 | Wagner et al. | |
| 2011/0153324 A1* | 6/2011 | Ballinger et al. | 704/235 |
| 2011/0184721 A1 | 7/2011 | Subramanian et al. | |
| 2011/0196580 A1 | 8/2011 | Xu et al. | |
| 2011/0216928 A1 | 9/2011 | Eisenberg et al. | |
| 2011/0237295 A1 | 9/2011 | Bartkowiak et al. | |
| 2011/0270922 A1 | 11/2011 | Jones et al. | |
| 2011/0307241 A1* | 12/2011 | Waibel et al. | 704/2 |
| 2012/0010886 A1* | 1/2012 | Razavilar | 704/246 |
| 2012/0025965 A1 | 2/2012 | Mochizuki et al. | |
| 2012/0046833 A1 | 2/2012 | Sanma et al. | |
| 2012/0069131 A1* | 3/2012 | Abelow | 348/14.01 |
| 2012/0072109 A1 | 3/2012 | Waite et al. | |
| 2012/0075407 A1 | 3/2012 | Wessling | |
| 2012/0197629 A1* | 8/2012 | Nakamura et al. | 704/3 |
| 2012/0323575 A1 | 12/2012 | Gibbon et al. | |
| 2013/0021950 A1 | 1/2013 | Chen et al. | |
| 2013/0022189 A1 | 1/2013 | Ganong, III et al. | |
| 2013/0057691 A1 | 3/2013 | Atsmon et al. | |
| 2013/0058471 A1 | 3/2013 | Garcia | |
| 2013/0063542 A1 | 3/2013 | Bhat et al. | |
| 2013/0103399 A1 | 4/2013 | Gammon | |
| 2013/0204616 A1 | 8/2013 | Aoki et al. | |
| 2014/0055242 A1 | 2/2014 | Mendonca et al. | |

OTHER PUBLICATIONS

U.S. Appl. No. 13/425,210, Lord et al.
U.S. Appl. No. 13/407,570, Lord et al.
U.S. Appl. No. 13/397,289, Lord et al.
U.S. Appl. No. 13/362,823, Lord et al.
U.S. Appl. No. 13/356,419, Lord et al.
U.S. Appl. No. 13/324,232, Lord et al.
U.S. Appl. No. 13/309,248, Lord et al.
Menon, Arvind et al; "Roadside Range Sensors for Intersection Decision Support"; bearing a date of Apr. 1, 2004; IEEE; pp. 1-6.

* cited by examiner

Fig. 3.1
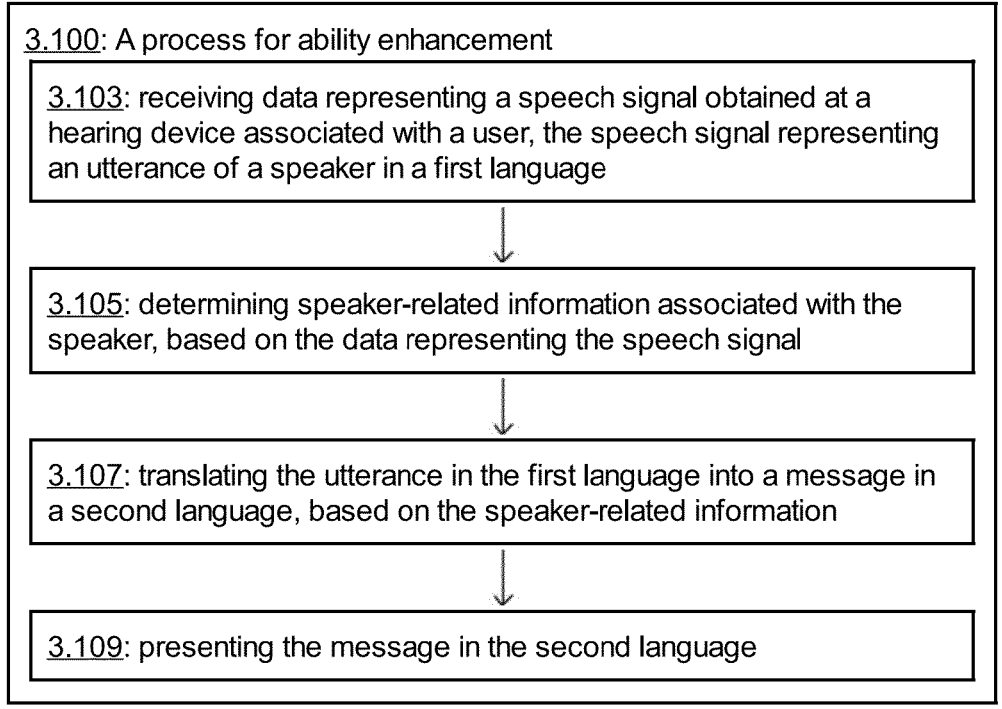
Fig. 3.2
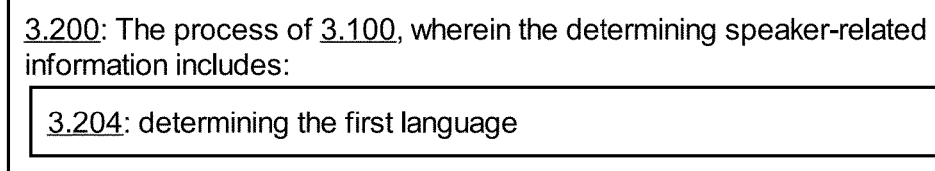

Fig. 3.3

3.300: The process of 3.200, wherein the determining the first language includes:

> 3.304: concurrently processing the received data with multiple speech recognizers that are each configured to recognize speech in a different corresponding language

> 3.305: selecting as the first language the language corresponding to a speech recognizer of the multiple speech recognizers that produces a result that has a higher confidence level than other of the multiple speech recognizers

Fig. 3.4

3.400: The process of 3.200, wherein the determining the first language includes:

> 3.404: identifying signal characteristics in the received data that are correlated with the first language

*Fig. 3.5*

3.500: The process of 3.200, wherein the determining the first language includes:

3.504: receiving an indication of a current location of the user

3.505: determining one or more languages that are commonly spoken at the current location

3.506: selecting one of the one or more languages as the first language

*Fig. 3.6*

3.600: The process of 3.200, wherein the determining the first language includes:

3.604: presenting indications of multiple languages to the user

3.605: receiving from the user an indication of one of the multiple languages

*Fig. 3.7*

3.700: The process of 3.200, further comprising:

3.704: selecting a speech recognizer configured to recognize speech in the first language

Fig. 3.8

3.800: The process of 3.100, wherein the translating the utterance in the first language into a message in a second language includes:

> 3.804: performing speech recognition, based on the speaker-related information, on the data representing the speech signal to convert the utterance in the first language into text representing the utterance in the first language

> 3.806: translating, based on the speaker-related information, the text representing the utterance in the first language into text representing the message in the second language

Fig. 3.9

3.900: The process of 3.800, wherein the presenting the message in the second language includes:

> 3.904: performing speech synthesis to convert the text representing the utterance in the second language into audio data representing the message in the second language

> 3.905: causing the audio data representing the message in the second language to be played to the user

Fig. 3.10

3.1000: The process of 3.800, wherein the performing speech recognition includes:

> 3.1004: performing speech recognition based on cepstral coefficients that represent the speech signal

Fig. 3.11

3.1100: The process of 3.800, wherein the performing speech recognition includes:

> 3.1104: performing hidden Markov model-based speech recognition

Fig. 3.12

3.1200: The process of 3.100, wherein the translating the utterance in the first language into a message in a second language includes:

> 3.1204: translating the utterance based on speaker-related information including an identity of the speaker

Fig. 3.13

3.1300: The process of 3.100, wherein the translating the utterance in the first language into a message in a second language includes:

> 3.1304: translating the utterance based on speaker-related information including a language model that is specific to the speaker

Fig. 3.14

3.1400: The process of 3.1300, wherein the translating the utterance based on speaker-related information including a language model that is specific to the speaker includes:

> 3.1404: translating the utterance based on a language model that is tailored to a group of people of which the speaker is a member

*Fig. 3.15*

3.1500: The process of 3.1300, wherein the translating the utterance based on speaker-related information including a language model that is specific to the speaker includes:

> 3.1504: generating the language model based on communications generated by the speaker

*Fig. 3.16*

3.1600: The process of 3.1500, wherein the generating the language model based on communications generated by the speaker includes:

> 3.1604: generating the language model based on emails transmitted by the speaker

*Fig. 3.17*

3.1700: The process of 3.1500, wherein the generating the language model based on communications generated by the speaker includes:

> 3.1704: generating the language model based on documents authored by the speaker

*Fig. 3.18*

3.1800: The process of 3.1500, wherein the generating the language model based on communications generated by the speaker includes:

> 3.1804: generating the language model based on social network messages transmitted by the speaker

Fig. 3.19

3.1900: The process of 3.100, wherein the translating the utterance in the first language into a message in a second language includes:

3.1904: translating the utterance based on speaker-related information including a speech model that is tailored to the speaker

Fig. 3.20

3.2000: The process of 3.1900, wherein the translating the utterance based on speaker-related information including a speech model that is tailored to the speaker includes:

3.2004: translating the utterance based on a speech model that is tailored to a group of people of which the speaker is a member

Fig. 3.21

3.2100: The process of 3.100, wherein the translating the utterance in the first language into a message in a second language includes:

3.2104: translating the utterance based on speaker-related information including an information item that references the speaker

Fig. 3.22

3.2200: The process of 3.100, wherein the translating the utterance in the first language into a message in a second language includes:

3.2204: translating the utterance based on speaker-related information including a document that references the speaker

Fig. 3.23

3.2300: The process of 3.100, wherein the translating the utterance in the first language into a message in a second language includes:

> 3.2304: translating the utterance based on speaker-related information including a message that references the speaker

Fig. 3.24

3.2400: The process of 3.100, wherein the translating the utterance in the first language into a message in a second language includes:

> 3.2404: translating the utterance based on speaker-related information including a calendar event that references the speaker

Fig. 3.25

3.2500: The process of 3.100, wherein the translating the utterance in the first language into a message in a second language includes:

> 3.2504: translating the utterance based on speaker-related information including an indication of gender of the speaker

Fig. 3.26

3.2600: The process of 3.100, wherein the translating the utterance in the first language into a message in a second language includes:

> 3.2604: translating the utterance based on speaker-related information including an organization to which the speaker belongs

Fig. 3.27

3.2700: The process of 3.100, wherein the determining speaker-related information includes:

> 3.2704: performing speech recognition to convert the received data into text data

> 3.2706: determining the speaker-related information based on the text data

Fig. 3.28

3.2800: The process of 3.2700, wherein the determining the speaker-related information based on the text data includes:

> 3.2804: finding a document that references the speaker and that includes one or more words in the text data

Fig. 3.29

3.2900: The process of 3.2700, further comprising:

> 3.2904: retrieving information items that reference the text data

Fig. 3.30

3.3000: The process of 3.100, wherein the determining speaker-related information includes:

> 3.3004: accessing information items associated with the speaker

Fig. 3.31

3.3100: The process of 3.3000, wherein the accessing information items associated with the speaker includes:

> 3.3104: searching for information items that reference the speaker

Fig. 3.32

3.3200: The process of 3.3000, wherein the accessing information items associated with the speaker includes:

> 3.3204: searching stored emails to find emails that reference the speaker

Fig. 3.33

3.3300: The process of 3.3000, wherein the accessing information items associated with the speaker includes:

> 3.3304: searching stored text messages to find text messages that reference the speaker

Fig. 3.34

3.3400: The process of 3.3000, wherein the accessing information items associated with the speaker includes:

> 3.3404: accessing a social networking service to find messages or status updates that reference the speaker

Fig. 3.35

3.3500: The process of 3.3000, wherein the accessing information items associated with the speaker includes:

> 3.3504: accessing a calendar to find information about appointments with the speaker

Fig. 3.36

3.3600: The process of 3.3000, wherein the accessing information items associated with the speaker includes:

> 3.3604: accessing a document store to find documents that reference the speaker

Fig. 3.37

3.3700: The process of 3.100, wherein the determining speaker-related information includes:

> 3.3704: performing voice identification based on the received data to identify the speaker

Fig. 3.38

3.3800: The process of 3.3700, wherein the performing voice identification includes:

> 3.3804: comparing properties of the speech signal with properties of previously recorded speech signals from multiple distinct speakers

Fig. 3.39

3.3900: The process of 3.3800, further comprising:

> 3.3904: processing voice messages from the multiple distinct speakers to generate voice print data for each of the multiple distinct speakers

Fig. 3.40

3.4000: The process of 3.3700, wherein the performing voice identification includes:

> 3.4004: processing telephone voice messages stored by a voice mail service

Fig. 3.41

3.4100: The process of 3.3700, further comprising:

> 3.4104: determining that the speaker cannot be identified

Fig. 3.42

3.4200: The process of 3.4100, further comprising:

3.4204: when it is determined that the speaker cannot be identified, storing the received data for system training

Fig. 3.43

3.4300: The process of 3.4100, further comprising:

3.4304: when it is determined that the speaker cannot be identified, notifying the user

Fig. 3.44

3.4400: The process of 3.100, further comprising:

3.4404: receiving data representing a speech signal that represents an utterance of the user

3.4406: determining the speaker-related information based on the data representing a speech signal that represents an utterance of the user

Fig. 3.45

3.4500: The process of 3.4400, wherein the determining the speaker-related information based on the data representing a speech signal that represents an utterance of the user includes:

3.4504: determining whether the utterance of the user includes a name of the speaker

Fig. 3.46

3.4600: The process of 3.100, wherein the determining speaker-related information includes:

> 3.4604: receiving context information related to the user
>
> 
>
> 3.4606: determining speaker-related information, based on the context information

Fig. 3.47

3.4700: The process of 3.4600, wherein the receiving context information related to the user includes:

> 3.4704: receiving an indication of a location of the user
>
> 
>
> 3.4706: determining a plurality of persons with whom the user commonly interacts at the location

Fig. 3.48

3.4800: The process of 3.4700, wherein the receiving an indication of a location of the user includes:

> 3.4804: receiving a GPS location from a mobile device of the user

Fig. 3.49

3.4900: The process of 3.4700, wherein the receiving an indication of a location of the user includes:

> 3.4904: receiving a network identifier that is associated with the location

Fig. 3.50

3.5000: The process of 3.4700, wherein the receiving an indication of a location of the user includes:

> 3.5004: receiving an indication that the user is at a workplace or a residence

Fig. 3.51

3.5100: The process of 3.4600, wherein the receiving context information related to the user includes:

> 3.5104: receiving information about a communication that references the speaker

Fig. 3.52

3.5200: The process of 3.5100, wherein the receiving information about a communication that references the speaker includes:

> 3.5204: receiving information about a message and/or a document that references the speaker

Fig. 3.53

3.5300: The process of 3.100, wherein the determining speaker-related information includes:

> 3.5304: identifying a plurality of candidate speakers
>
> 
>
> 3.5305: presenting indications of the plurality of candidate speakers

Fig. 3.54

3.5400: The process of 3.5300,

> 3.5402: receiving from the user a selection of one of the plurality of candidate speakers that is the speaker
>
> 
>
> 3.5403: determining the speaker-related information based on the selection received from the user

Fig. 3.55

3.5500: The process of 3.5300,

> 3.5502: receiving from the user an indication that none of the plurality of candidate speakers are the speaker
>
> 
>
> 3.5503: training a speaker identification system based on the received indication

Fig. 3.56

3.5600: The process of 3.5300,

> 3.5602: training a speaker identification system based on a selection regarding the plurality of candidate speakers received from a user

Fig. 3.57

3.5700: The process of 3.100, further comprising:

> 3.5704: developing a corpus of speaker data by recording speech from a plurality of speakers

> 3.5705: determining the speaker-related information and/or translating the utterance based at least in part on the corpus of speaker data

Fig. 3.58

3.5800: The process of 3.5700, further comprising:

> 3.5804: generating a speech model associated with each of the plurality of speakers, based on the recorded speech

Fig. 3.59

3.5900: The process of 3.5700, further comprising:

3.5904: receiving feedback regarding accuracy of the speaker-related information

3.5905: training a speech processor based at least in part on the received feedback

Fig. 3.60

3.6000: The process of 3.100, wherein the presenting the message in the second language includes:

3.6004: transmitting the message in the second language from a first device to a second device

Fig. 3.61

3.6100: The process of 3.6000, wherein the transmitting the message in the second language from a first device to a second device includes:

3.6104: wirelessly transmitting the message in the second language

Fig. 3.62

3.6200: The process of 3.6000, wherein the transmitting the message in the second language from a first device to a second device includes:

3.6204: transmitting the message in the second language from a smart phone or portable media device to the second device

Fig. 3.63

3.6300: The process of 3.6000, wherein the transmitting the message in the second language from a first device to a second device includes:

> 3.6304: transmitting the message in the second language from a server system to the second device

Fig. 3.64

3.6400: The process of 3.6300, wherein the transmitting the message in the second language from a server system includes:

> 3.6404: transmitting the message in the second language from a server system that resides in a data center

Fig. 3.65

3.6500: The process of 3.6300, wherein the transmitting the message in the second language from a server system includes:

> 3.6504: transmitting the message in the second language from a server system to a desktop computer of the user

Fig. 3.66

3.6600: The process of 3.6300, wherein the transmitting the message in the second language from a server system includes:

> 3.6604: transmitting the message in the second language from a server system to a mobile device of the user

Fig. 3.67

3.6700: The process of 3.100, further comprising:

> 3.6704: performing the receiving data representing a speech signal, the determining speaker-related information, the translating the utterance in the first language into a message in a second language, and/or the presenting the message in the second language on a mobile device that is operated by the user

Fig. 3.68

3.6800: The process of 3.100, further comprising:

> 3.6804: performing the receiving data representing a speech signal, the determining speaker-related information, the translating the utterance in the first language into a message in a second language, and/or the presenting the message in the second language on a desktop computer that is operated by the user

Fig. 3.69

3.6900: The process of 3.100, further comprising:

> 3.6904: determining to perform at least some of determining speaker-related information or translating the utterance in the first language into a message in a second language on another computing device that has available processing capacity

Fig. 3.70

3.7000: The process of 3.6900, further comprising:

> 3.7004: receiving at least some of speaker-related information from the another computing device

Fig. 3.71

3.7100: The process of 3.100, further comprising:

> 3.7104: informing the user of the speaker-related information

Fig. 3.72

3.7200: The process of 3.7100, further comprising:

> 3.7204: receiving feedback from the user regarding correctness of the speaker-related information

> 3.7205: refining the speaker-related information based on the received feedback

Fig. 3.73

3.7300: The process of 3.7200, wherein the refining the speaker-related information based on the received feedback includes:

3.7304: presenting speaker-related information corresponding to each of multiple likely speakers

3.7305: receiving from the user an indication that the speaker is one of the multiple likely speakers

Fig. 3.74

3.7400: The process of 3.7100, wherein the informing the user of the speaker-related information includes:

3.7404: presenting the speaker-related information on a display of the hearing device

Fig. 3.75

3.7500: The process of 3.7100, wherein the informing the user of the speaker-related information includes:

3.7504: presenting the speaker-related information on a display of a computing device that is distinct from the hearing device

*Fig. 3.76*

3.7600: The process of 3.7100, wherein the informing the user of the speaker-related information includes:

> 3.7604: audibly informing the user to view the speaker-related information on a display device

*Fig. 3.77*

3.7700: The process of 3.7600, wherein the audibly informing the user includes:

> 3.7704: playing a tone via an audio speaker of the hearing device

*Fig. 3.78*

3.7800: The process of 3.7600, wherein the audibly informing the user includes:

> 3.7804: playing synthesized speech via an audio speaker of the hearing device, the synthesized speech telling the user to view the display device

*Fig. 3.79*

3.7900: The process of 3.7600, wherein the audibly informing the user includes:

> 3.7904: telling the user that at least one of a document, a calendar event, and/or a communication is available for viewing on the display device

Fig. 3.80

3.8000: The process of 3.7600, wherein the audibly informing the user includes:

> 3.8004: audibly informing the user in a manner that is not audible to the speaker

LANGUAGE TRANSLATION BASED ON SPEAKER-RELATED INFORMATION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 13/309,248, entitled AUDIBLE ASSISTANCE, filed 1 Dec. 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/324,232, entitled VISUAL PRESENTATION OF SPEAKER-RELATED INFORMATION, filed 13 Dec. 2011, which is currently co-pending, or is an application of which a currently co-pending application is entitled to the benefit of the filing date.

TECHNICAL FIELD

The present disclosure relates to methods, techniques, and systems for ability enhancement and, more particularly, to methods, techniques, and systems for language translation enhanced by using speaker-related information determined from speaker utterances and/or other sources.

BACKGROUND

Human abilities such as hearing, vision, memory, foreign or native language comprehension, and the like may be limited for various reasons. For example, with aging, various abilities such as hearing, vision, memory, may decline or otherwise become compromised. As the population in general ages, such declines may become more common and widespread. In addition, young people are increasingly listening to music through headphones, which may also result in hearing loss at earlier ages.

In addition, limits on human abilities may be exposed by factors other than aging, injury, or overuse. As one example, the world population is faced with an ever increasing amount of information to review, remember, and/or integrate. Managing increasing amounts of information becomes increasingly difficult in the face of limited or declining abilities such as hearing, vision, and memory. As another example, as the world becomes increasingly virtually and physically connected (e.g., due to improved communication and cheaper travel), people are more frequently encountering others who speak different languages.

Current approaches to addressing limits on human abilities may suffer from various drawbacks. For example, there may be a social stigma connected with wearing hearing aids, corrective lenses, or similar devices. In addition, hearing aids typically perform only limited functions, such as amplifying or modulating sounds for a hearer. As another example, current approaches to foreign language translation, such as phrase books or time-intensive language acquisition, are typically inefficient and/or unwieldy.

BRIEF DESCRIPTION OF THE DRAWINGS

FIGS. 3.1-3.80 are example flow diagrams of ability enhancement processes performed by example embodiments.

DETAILED DESCRIPTION

Figure 1A:
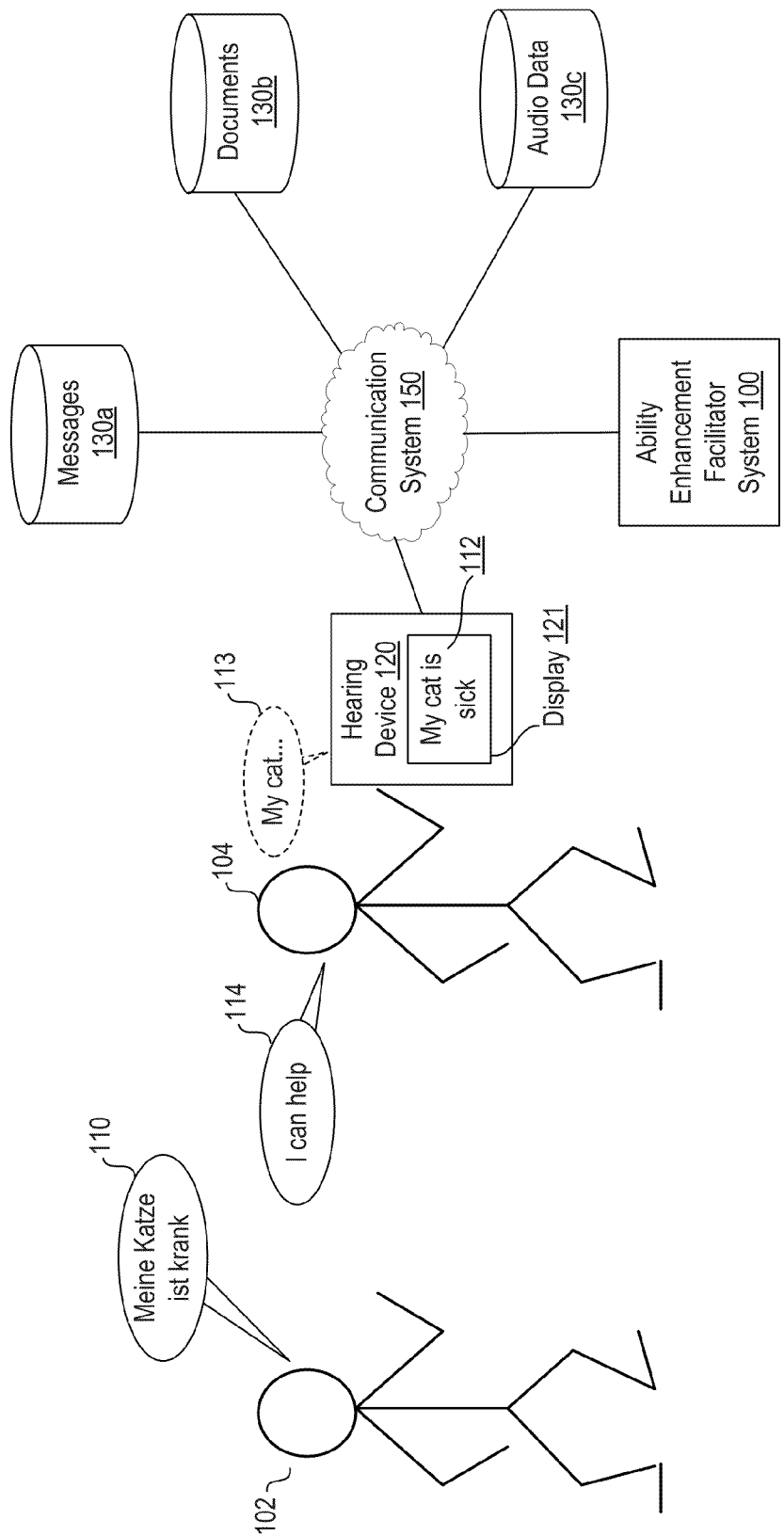
FIG. 1A is an example block diagram of an ability enhancement facilitator system according to an example embodiment.

Embodiments described herein provide enhanced computer- and network-based methods and systems for ability enhancement and, more particularly, for language translation enhanced by using speaker-related information determined at least in part on speaker utterances. Example embodiments provide an Ability Enhancement Facilitator System ("AEFS"). The AEFS may augment, enhance, or improve the senses (e.g., hearing), faculties (e.g., memory, language comprehension), and/or other abilities of a user, such as by performing automatic language translation from a first language used by a speaker to a second language that is familiar to a user. For example, when a user engages a speaker in conversation, the AEFS may "listen" to the speaker in order to determine speaker-related information, such as demographic information about the speaker (e.g., gender, language, country/region of origin), identifying information about the speaker (e.g., name, title), and/or events/communications relating to the speaker and/or the user. Then, the AEFS may use the determined information to augment, improve, enhance, adapt, or otherwise configure the operation of automatic language translation performed on foreign language utterances of the speaker. As the speaker generates utterances in the foreign language, the AEFS may translate the utterances into a representation (e.g., a message in textual format) in a second language that is familiar to the user. The AEFS can then present the representation in the second language to the user, allowing the user to engage in a more productive conversation with the speaker.

In some embodiments, the AEFS is configured to receive data that represents an utterance of a speaker in a first language and that is obtained at or about a hearing device associated with a user. The hearing device may be or include any device that is used by the user to hear sounds, including a hearing aid, a personal media device/player, a telephone, or the like. The AEFS may then determine speaker-related information associated with the speaker, based at least in part on the received data, such as by performing speaker recognition and/or speech recognition with the received data. The speaker-related information may be or include demographic information about the speaker (e.g., gender, country/region of origin, language(s) spoken by the speaker), identifying information about the speaker (e.g., name or title), and/or information items that reference the speaker (e.g., a document, event, communication).

Then, the AEFS may translate the utterance in the first language into a message in a second language, based at least in part on the speaker-related information. The message in the second language is at least an approximate translation of the utterance in the first language. Such a translation process may include some combination of speech recognition, natural language processing, machine translation, or the like. Upon performing the translation, the AEFS may present the message in the second language to the user. The message in the second language may be presented visually, such as via a visual display of a computing system/device that is accessible to the user. The message in the second language may also or instead be presented audibly, such as by "speaking" the message in the second language via speech synthesis through a hearing aid, audio speaker, or other audio output device accessible to the user. The presentation of the message in the second language may occur via the same or a different device than the hearing device that obtained the initial utterance.

1. Ability Enhancement Facilitator System Overview

FIG. 1A is an example block diagram of an ability enhancement facilitator system according to an example embodiment. In particular, FIG. 1A shows a user 104 who is engaging in a conversation with a speaker 102. Abilities of the user 104 are being enhanced, via a hearing device 120, by an Ability Enhancement Facilitator System ("AEFS") 100. The hearing device 120 includes a display 121 that is configured to present text and/or graphics. The hearing device 120 also includes a speaker (not shown) that is configured to present audio output. The AEFS 100 and the hearing device 120 are communicatively coupled to one another via a communication system 150. The AEFS 100 is also communicatively coupled to speaker-related information sources 130, including messages 130a, documents 130b, and audio data 130c. The AEFS 100 uses the information in the information sources 130, in conjunction with data received from the hearing device 120, to determine speaker-related information associated with the speaker 102.

In the scenario illustrated in FIG. 1A, the conversation between the speaker 102 and the user 104 is in its initial moments. The speaker 102 has made an utterance 110 in a first language (German, in this example) by speaking the words "Meine Katze ist krank." The user 104, however, has no or limited German language abilities. As will be discussed further below, the AEFS 100, in concert with the hearing device 120, translates the received utterance 110 for the user 104, so that the user 104 can assist or otherwise usefully engage the speaker 102.

The hearing device 120 receives a speech signal that represents the utterance 110, such as by receiving a digital representation of an audio signal received by a microphone of the hearing device 120. The hearing device 120 then transmits data representing the speech signal to the AEFS 100. Transmitting the data representing the speech signal may include transmitting audio samples (e.g., raw audio data), compressed audio data, speech vectors (e.g., mel frequency cepstral coefficients), and/or any other data that may be used to represent an audio signal.

The AEFS 100 then determines speaker-related information associated with the speaker 102. Initially, the AEFS 100 may determine speaker-related information by automatically determining the language that is being used by the speaker 102. Determining the language may be based on signal processing techniques that identify signal characteristics unique to particular languages. Determining the language may also or instead be performed by simultaneous or concurrent application of multiple speech recognizers that are each configured to recognize speech in a corresponding language, and then choosing the language corresponding to the recognizer that produces the result having the highest confidence level. Determining the language may also or instead be based on contextual factors, such as GPS information indicating that the user 104 is in Germany, Austria, or some other reason where German is commonly spoken.

In some embodiments, determining speaker-related information may include identifying the speaker 102 based on the received data representing the speech signal. Identifying the speaker 102 may include performing speaker recognition, such as by generating a "voice print" from the received data and comparing the generated voice print to previously obtained voice prints. For example, the generated voice print may be compared to multiple voice prints that are stored as audio data 130c and that each correspond to a speaker, in order to determine a speaker who has a voice that most closely matches the voice of the speaker 102. The voice prints stored as audio data 130c may be generated based on various sources of data, including data corresponding to speakers previously identified by the AEFS 100, voice mail messages, speaker enrollment data, or the like.

In some embodiments, identifying the speaker 102 may include performing speech recognition, such as by automatically converting the received data representing the speech signal into text. The text of the speaker's utterance 110 may then be used to identify the speaker. In particular, the text may identify one or more entities such as information items (e.g., communications, documents), events (e.g., meetings, deadlines), persons, or the like, that may be used by the AEFS 100 to identify the speaker. The information items may be accessed with reference to the messages 130a and/or documents 130b. As one example, the speaker's utterance 110 may identify an email message that was sent to the speaker 102 and the user 104 (e.g., "That sure was a nasty email Bob sent us"). As another example, the speaker's utterance 110 may identify a meeting or other event to which both the speaker 102 and the user 104 are invited.

Note that in some cases, the speaker's utterance 110 may not definitively identify the speaker 102, such as because the user 104 may only have just met the speaker 102 (e.g., if the user is traveling). In other cases, a definitive identification may not be obtained because a communication being used to identify the speaker was sent to recipients in addition to the speaker 102 and the user 104, leaving some ambiguity as to the actual identity of the speaker. However, in such cases, a preliminary identification of multiple candidate speakers may still be used by the AEFS 100 to narrow the set of potential speakers, and may be combined with (or used to improve) other techniques for speaker identification, including speaker recognition as discussed above. In addition, even if the speaker 102 is unknown to the user 104 the AEFS 100 may still determine useful demographic or other speaker-related information that may be fruitfully employed for speech recognition purposes.

Note also that speaker-related information need not definitively identify the speaker. In particular, it may also or instead be or include other information about or related to the speaker, such as demographic information including the gender of the speaker 102, his country or region of origin, the language(s) spoken by the speaker 102, or the like. Speaker-related information may include an organization that includes the speaker (along with possibly other persons, such as a company or firm), an information item that references the speaker (and possibly other persons), an event involving the speaker, or the like. The speaker-related information may generally be determined with reference to the messages 130a, documents 130b, and/or audio data 130c. For example, having determined the identity of the speaker 102, the AEFS 100 may search for emails and/or documents that are stored as messages 130a and/or documents 103b and that reference (e.g., are sent to, are authored by, are named in) the speaker 102.

Other types of speaker-related information are contemplated, including social networking information, such as personal or professional relationship graphs represented by a social networking service, messages or status updates sent within a social network, or the like. Social networking information may also be derived from other sources, including email lists, contact lists, communication patterns (e.g., frequent recipients of emails), or the like.

Having determined speaker-related information, the AEFS 100 then translates the utterance 110 in German into an utterance in a second language. In this example, the second language is the preferred language of the user 104, English. In some embodiments, the AEFS 100 translates the utterance 110 by first performing speech recognition to translate the utterance 110 into a textual representation that includes a sequence of German words. Then, the AEFS 100 may translate the German text into a message including English text, using machine translation techniques. Speech recognition and/or machine translation may be modified, enhanced, and/or otherwise adapted based on the speaker-related information. For example, a speech recognizer may use speech or language models tailored to the speaker's gender, accent/dialect (e.g., determined based on country/region of origin), social class, or the like. As another example, a lexicon that is specific to the speaker 102 may be used during speech recognition and/or language translation. Such a lexicon may be determined based on prior communications of the speaker 102, profession of the speaker (e.g., engineer, attorney, doctor), or the like.

Once the AEFS 100 has translated the initial utterance 110 into a message in English, the AEFS 100 can present the English message to the user 104. Various techniques are contemplated. In one approach, the AEFS 100 causes the hearing device 120 (or some other device accessible to the user) to visually display the message as message 112 on the display 121. In the illustrated example, the AEFS 100 causes a message 112 that includes the text "My cat is sick" (which is the English translation of "Meine Katze ist krank") to be displayed on the display 121. Upon reading the message 112 and thereby learning about the condition of the speaker's cat, the user 104 responds to the speaker's original utterance 110 by with a response utterance 114 by speaking the words "I can help." The speaker 102 may either understand English or himself have access to the AEFS 100 so that the speaker 102 and the user 104 can have a productive conversation. As the speaker 102 and the user 104 continue to converse, the AEFS 100 may monitor the conversation and continue to provide translations to the user 104 (and possibly the speaker 102).

In another approach, the AEFS 100 causes the hearing device 120 (or some other device) to "speak" or "tell" the user 104 the message in English. Presenting a message in this manner may include converting a textual representation of the message into audio via text-to-speech processing (e.g., speech synthesis), and then presenting the audio via an audio speaker (e.g., earphone, earpiece, earbud) of the hearing device 120. In the illustrated scenario, the AEFS 100 causes the hearing device 120 to make an utterance 113 by playing audio of the words "My cat is sick" via a speaker (not shown) of the hearing device 120.

Figure 1B:
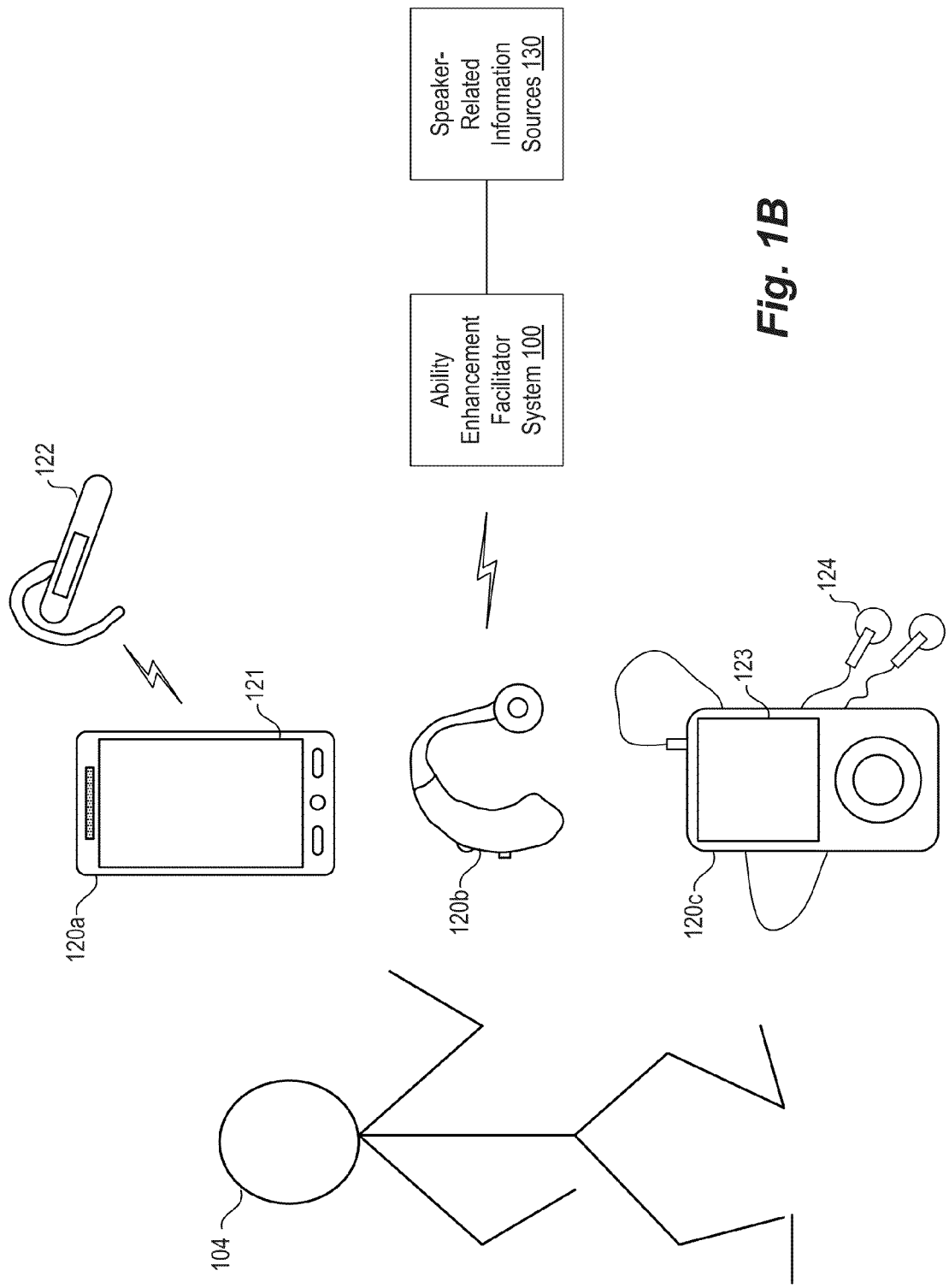
FIG. 1B is an example block diagram illustrating various hearing devices according to example embodiments.

FIG. 1B is an example block diagram illustrating various hearing devices according to example embodiments. In particular, FIG. 1B illustrates an AEFS 100 in wireless communication with example hearing devices 120a-120c. Hearing device 120a is a smart phone in communication with a wireless (e.g., Bluetooth) earpiece 122. Hearing device 120a includes a display 121. Hearing device 120b is a hearing aid device. Hearing device 120c is a personal media player that includes a display 123 and attached "earbud" earphones 124. Each of the illustrated hearing devices 120 includes or may be communicatively coupled to a microphone operable to receive a speech signal from a speaker. As described above, the hearing device 120 may then convert the speech signal into data representing the speech signal, and then forward the data to the AEFS 100.

As an initial matter, note that the AEFS 100 may use output devices of a hearing device or other devices to present translations as well as other information, such as speaker-related information that may generally assist the user 104 in interacting with the speaker 102. For example, in addition to providing translations, the AEFS 100 may present speaker-related information about the speaker 102, such as his name, title, communications that reference or are related to the speaker, and the like.

For audio output, each of the illustrated hearing devices 120 may include or be communicatively coupled to an audio speaker operable to generate and output audio signals that may be perceived by the user 104. As discussed above, the AEFS 100 may use such a speaker to provide translations to the user 104. The AEFS 100 may also or instead audibly notify, via a speaker of a hearing device 120, the user 104 to view a translation or other information displayed on the hearing device 120. For example, the AEFS 100 may cause a tone (e.g., beep, chime) to be played via the earphones 124 of the personal media player hearing device 120c. Such a tone may then be recognized by the user 104, who will in response attend to information displayed on the display 123. Such audible notification may be used to identify a display that is being used as a current display, such as when multiple displays are being used. For example, different first and second tones may be used to direct the user's attention to a desktop display and a smart phone display, respectively. In some embodiments, audible notification may include playing synthesized speech (e.g., from text-to-speech processing) telling the user 104 to view speaker-related information on a particular display device (e.g., "Recent email on your smart phone").

The AEFS 100 may generally cause translations and/or speaker-related information to be presented on various destination output devices. In some embodiments, the AEFS 100 may use a display of a hearing device as a target for displaying a translation or other information. For example, the AEFS 100 may display a translation or speaker-related information on the display 121 of the smart phone 120a. On the other hand, when the hearing device does not have its own display, such as hearing aid device 120b, the AEFS 100 may display speaker-related information on some other destination display that is accessible to the user 104. For example, when the hearing aid device 120b is the hearing device and the user also has the personal media player 120c in his possession, the AEFS 100 may elect to display speaker-related information upon the display 123 of the personal media player 120c.

The AEFS 100 may determine a destination output device for a translation, speaker-related information, or other information. In some embodiments, determining a destination output device may include selecting from one of multiple possible destination displays based on whether a display is capable of displaying all of the information. For example, if the environment is noisy, the AEFS may elect to visually display a translation rather than play it through a speaker. As another example, if the user 104 is proximate to a first display that is capable of displaying only text and a second display capable of displaying graphics, the AEFS 100 may select the second display when the presented information includes graphics content (e.g., an image). In some embodiments, determining a destination display may include selecting from one of multiple possible destination displays based on the size of each display. For example, a small LCD display (such as may be found on a mobile phone) may be suitable for displaying a message that is just a few characters (e.g., a name or greeting) but not be suitable for displaying longer message or large document. Note that the AEFS 100 may select between multiple potential target output devices even when the hearing device itself includes its own display and/or speaker.

Determining a destination output device may be based on other or additional factors. In some embodiments, the AEFS 100 may use user preferences that have been inferred (e.g., based on current or prior interactions with the user 104) and/or explicitly provided by the user. For example, the AEFS 100 may determine to present a translation, an email, or other speaker-related information onto the display 121 of the smart phone 120a based on the fact that the user 104 is currently interacting with the smart phone 120a.

Note that although the AEFS 100 is shown as being separate from a hearing device 120, some or all of the functions of the AEFS 100 may be performed within or by the hearing device 120 itself. For example, the smart phone hearing device 120a and/or the media player hearing device 120c may have sufficient processing power to perform all or some functions of the AEFS 100, including one or more of speaker identification, determining speaker-related information, speaker recognition, speech recognition, language translation, presenting information, or the like. In some embodiments, the hearing device 120 includes logic to determine where to perform various processing tasks, so as to advantageously distribute processing between available resources, including that of the hearing device 120, other nearby devices (e.g., a laptop or other computing device of the user 104 and/or the speaker 102), remote devices (e.g., "cloud-based" processing and/or storage), and the like.

Other types of hearing devices are contemplated. For example, a land-line telephone may be configured to operate as a hearing device, so that the AEFS 100 can translate utterances from speakers who are engaged in a conference call. As another example, a hearing device may be or be part of a desktop computer, laptop computer, PDA, tablet computer, or the like.

Figure 2:
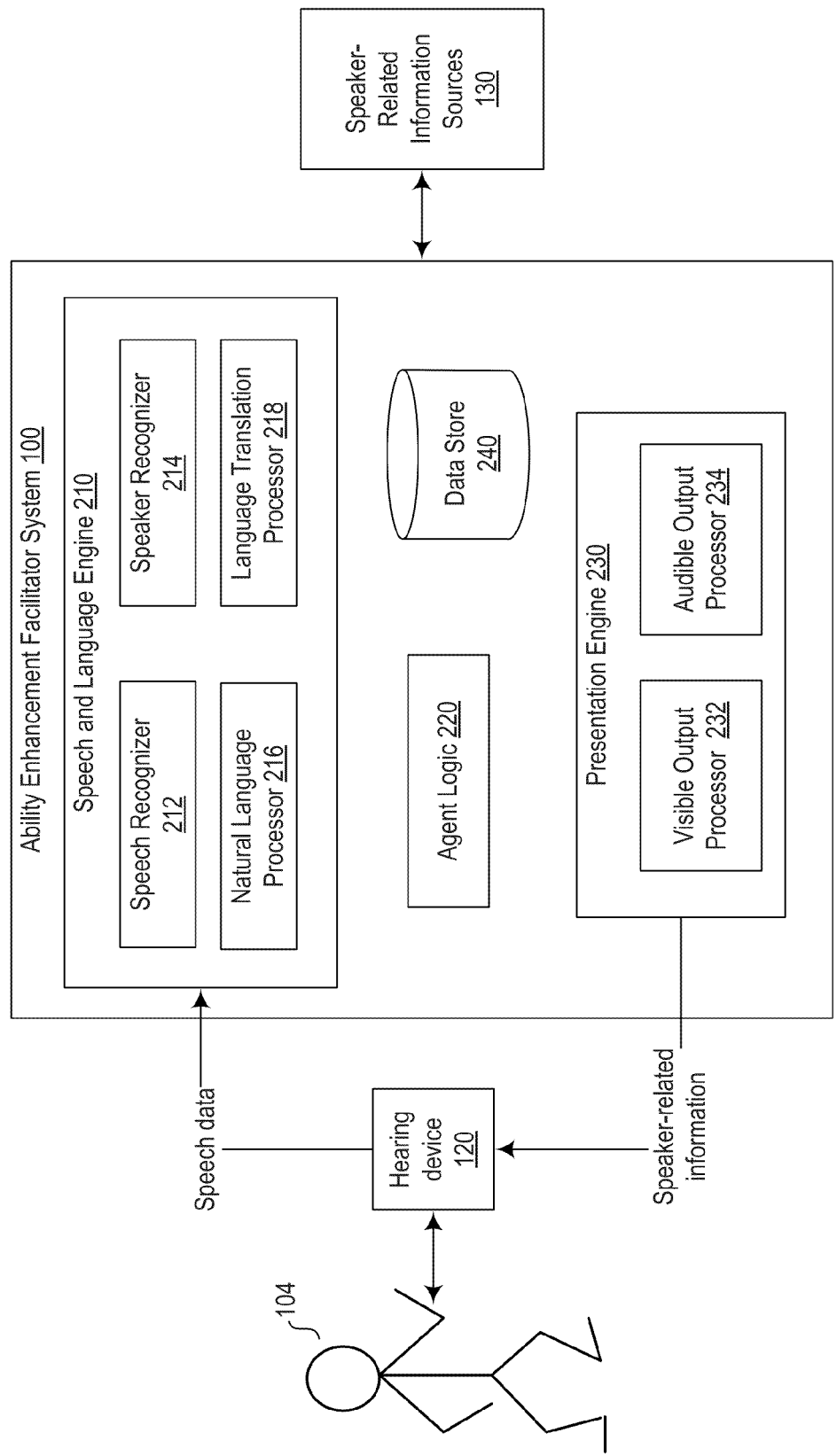
FIG. 2 is an example functional block diagram of an example ability enhancement facilitator system according to an example embodiment.

FIG. 2 is an example functional block diagram of an example ability enhancement facilitator system according to an example embodiment. In the illustrated embodiment of FIG. 2, the AEFS 100 includes a speech and language engine 210, agent logic 220, a presentation engine 230, and a data store 240.

The speech and language engine 210 includes a speech recognizer 212, a speaker recognizer 214, a natural language processor 216, and a language translation processor 218. The speech recognizer 212 transforms speech audio data received from the hearing device 120 into textual representation of an utterance represented by the speech audio data. In some embodiments, the performance of the speech recognizer 212 may be improved or augmented by use of a language model (e.g., representing likelihoods of transitions between words, such as based on n-grams) or speech model (e.g., representing acoustic properties of a speaker's voice) that is tailored to or based on an identified speaker. For example, once a speaker has been identified, the speech recognizer 212 may use a language model that was previously generated based on a corpus of communications and other information items authored by the identified speaker. A speaker-specific language model may be generated based on a corpus of documents and/or messages authored by a speaker. Speaker-specific speech models may be used to account for accents or channel properties (e.g., due to environmental factors or communication equipment) that are specific to a particular speaker, and may be generated based on a corpus of recorded speech from the speaker. In some embodiments, multiple speech recognizers are present, each one configured to recognize speech in a different language.

The speaker recognizer 214 identifies the speaker based on acoustic properties of the speaker's voice, as reflected by the speech data received from the hearing device 120. The speaker recognizer 214 may compare a speaker voice print to previously generated and recorded voice prints stored in the data store 240 in order to find a best or likely match. Voice prints or other signal properties may be determined with reference to voice mail messages, voice chat data, or some other corpus of speech data.

The natural language processor 216 processes text generated by the speech recognizer 212 and/or located in information items obtained from the speaker-related information sources 130. In doing so, the natural language processor 216 may identify relationships, events, or entities (e.g., people, places, things) that may facilitate speaker identification, language translation, and/or other functions of the AEFS 100. For example, the natural language processor 216 may process status updates posted by the user 104 on a social networking service, to determine that the user 104 recently attended a conference in a particular city, and this fact may be used to identify a speaker and/or determine other speaker-related information, which may in turn be used for language translation or other functions.

The language translation processor 218 translates from one language to another, for example, by converting text in a first language to text in a second language. The text input to the language translation processor 218 may be obtained from, for example, the speech recognizer 212 and/or the natural language processor 216. The language translation processor 218 may use speaker-related information to improve or adapt its performance. For example, the language translation processor 218 may use a lexicon or vocabulary that is tailored to the speaker, such as may be based on the speaker's country/region of origin, the speaker's social class, the speaker's profession, or the like.

The agent logic 220 implements the core intelligence of the AEFS 100. The agent logic 220 may include a reasoning engine (e.g., a rules engine, decision trees, Bayesian inference engine) that combines information from multiple sources to identify speakers, determine speaker-related information, and/or perform translations. For example, the agent logic 220 may combine spoken text from the speech recognizer 212, a set of potentially matching (candidate) speakers from the speaker recognizer 214, and information items from the information sources 130, in order to determine a most likely identity of the current speaker. As another example, the agent logic 220 may identify the language spoken by the speaker by analyzing the output of multiple speech recognizers that are each configured to recognize speech in a different language, to identify the language of the speech recognizer that returns the highest confidence result as the spoken language.

The presentation engine 230 includes a visible output processor 232 and an audible output processor 234. The visible output processor 232 may prepare, format, and/or cause information to be displayed on a display device, such as a display of the hearing device 120 or some other display (e.g., a desktop or laptop display in proximity to the user 104). The agent logic 220 may use or invoke the visible output processor 232 to prepare and display information, such as by formatting or otherwise modifying a translation or some speaker-related information to fit on a particular type or size of display. The audible output processor 234 may include or use other components for generating audible output, such as tones, sounds, voices, or the like. In some embodiments, the agent logic 220 may use or invoke the audible output processor 234 in order to convert a textual message (e.g., a translation or speaker-related information) into audio output suitable for presentation via the hearing device 120, for example by employing a text-to-speech processor.

Note that although speaker identification and/or determining speaker-related information is herein sometimes described as including the positive identification of a single speaker, it may instead or also include determining likelihoods that each of one or more persons is the current speaker. For example, the speaker recognizer 214 may provide to the agent logic 220 indications of multiple candidate speakers, each having a corresponding likelihood or confidence level. The agent logic 220 may then select the most likely candidate based on the likelihoods alone or in combination with other information, such as that provided by the speech recognizer 212, natural language processor 216, speaker-related information sources 130, or the like. In some cases, such as when there are a small number of reasonably likely candidate speakers, the agent logic 220 may inform the user 104 of the identities all of the candidate speakers (as opposed to a single speaker) candidate speaker, as such information may be sufficient to trigger the user's recall and enable the user to make a selection that informs the agent logic 220 of the speaker's identity.

2. Example Processes

FIGS. 3.1-3.80 are example flow diagrams of ability enhancement processes performed by example embodiments.

FIG. 3.1 is an example flow diagram of example logic for ability enhancement. The illustrated logic in this and the following flow diagrams may be performed by, for example, a hearing device 120 and/or one or more components of the AEFS 100 described with respect to FIG. 2, above. More particularly, FIG. 3.1 illustrates a process 3.100 that includes operations performed by or at the following block(s).

At block 3.103, the process performs receiving data representing a speech signal obtained at a hearing device associated with a user, the speech signal representing an utterance of a speaker in a first language. The received data may be or represent the speech signal itself (e.g., audio samples) and/or higher-order information (e.g., frequency coefficients). The data may be received by or at the hearing device 120 and/or the AEFS 100.

At block 3.105, the process performs determining speaker-related information associated with the speaker, based on the data representing the speech signal. The speaker-related information may include demographic information about the speaker, including gender, language spoken, country of origin, region of origin, or the like. The speaker-related information may also or instead include identifiers of the speaker (e.g., names, titles) and/or related information, such as documents, emails, calendar events, or the like. The speaker-related information may be determined based on signal properties of the speech signal (e.g., a voice print) and/or on the content of the utterance, such as a name, event, entity, or information item that was mentioned by the speaker.

At block 3.107, the process performs translating the utterance in the first language into a message in a second language, based on the speaker-related information. The utterance may be translated by first performing speech recognition on the data representing the speech signal to convert the utterance into textual form. Then, the text of the utterance may be translated into the second language using a natural language processing and/or machine translation techniques. The speaker-related information may be used to improve, enhance, or otherwise modify the process of machine translation. For example, based on the identity of the speaker, the process may use a language or speech model that is tailored to the speaker in order to improve a machine translation process. As another example, the process may use one or more information items that reference the speaker to improve machine translation, such as by disambiguating references in the utterance of the speaker.

At block 3.109, the process performs presenting the message in the second language. The message may be presented in various ways including using audible output (e.g., via text-to-speech processing of the message) and/or using visible output of the message (e.g., via a display screen of the hearing device or some other device that is accessible to the user).

FIG. 3.2 is an example flow diagram of example logic illustrating an example embodiment of process 3.100 of FIG. 3.1. More particularly, FIG. 3.2 illustrates a process 3.200 that includes the process 3.100, wherein the determining speaker-related information includes operations performed by or at the following block(s).

At block 3.204, the process performs determining the first language. In some embodiments, the process may determine or identify the first language, possibly prior to performing language translation. For example, the process may determine that the speaker is speaking in German, so that it can configure a speech recognizer to recognize German language utterances.

FIG. 3.3 is an example flow diagram of example logic illustrating an example embodiment of process 3.200 of FIG. 3.2. More particularly, FIG. 3.3 illustrates a process 3.300 that includes the process 3.200, wherein the determining the first language includes operations performed by or at the following block(s).

At block 3.304, the process performs concurrently processing the received data with multiple speech recognizers that are each configured to recognize speech in a different corresponding language. For example, the process may utilize speech recognizers for German, French, English, Chinese, Spanish, and the like, to attempt to recognize the speaker's utterance.

At block 3.305, the process performs selecting as the first language the language corresponding to a speech recognizer of the multiple speech recognizers that produces a result that has a higher confidence level than other of the multiple speech recognizers. Typically, a speech recognizer may provide a confidence level corresponding with each recognition result. The process can exploit this confidence level to determine the most likely language being spoken by the speaker, such as by taking the result with the highest confidence level, if one exists.

FIG. 3.4 is an example flow diagram of example logic illustrating an example embodiment of process 3.200 of FIG. 3.2. More particularly, FIG. 3.4 illustrates a process 3.400 that includes the process 3.200, wherein the determining the first language includes operations performed by or at the following block(s).

At block 3.404, the process performs identifying signal characteristics in the received data that are correlated with the first language. In some embodiments, the process may exploit signal properties or characteristics that are highly correlated with particular languages. For example, spoken German may include phonemes that are unique to or at least more common in German than in other languages.

FIG. 3.5 is an example flow diagram of example logic illustrating an example embodiment of process 3.200 of FIG. 3.2. More particularly, FIG. 3.5 illustrates a process 3.500 that includes the process 3.200, wherein the determining the first language includes operations performed by or at the following block(s).

At block 3.504, the process performs receiving an indication of a current location of the user. The current location may be based on a GPS coordinate provided by the hearing device 120 or some other device. The current location may be determined based on other context information, such as a network identifier, travel documents, or the like.

At block 3.505, the process performs determining one or more languages that are commonly spoken at the current location. The process may reference a knowledge base or other information that associates locations with common languages.

At block 3.506, the process performs selecting one of the one or more languages as the first language.

FIG. 3.6 is an example flow diagram of example logic illustrating an example embodiment of process 3.200 of FIG. 3.2. More particularly, FIG. 3.6 illustrates a process 3.600 that includes the process 3.200, wherein the determining the first language includes operations performed by or at the following block(s).

At block 3.604, the process performs presenting indications of multiple languages to the user. In some embodiments, the process may ask the user to choose the language of the speaker. For example, the process may not be able to determine the language itself, or the process may have determined multiple equally likely candidate languages. In such circumstances, the process may prompt or otherwise request that the user indicate the language of the speaker.

At block 3.605, the process performs receiving from the user an indication of one of the multiple languages. The user may identify the language in various ways, such as via a spoken command, a gesture, a user interface input, or the like.

FIG. 3.7 is an example flow diagram of example logic illustrating an example embodiment of process 3.200 of FIG. 3.2. More particularly, FIG. 3.7 illustrates a process 3.700 that includes the process 3.200 and which further includes operations performed by or at the following block(s).

At block 3.704, the process performs selecting a speech recognizer configured to recognize speech in the first language. Once the process has determined the language of the speaker, it may select or configure a speech recognizer or other component (e.g., machine translation engine) to process the first language.

FIG. 3.8 is an example flow diagram of example logic illustrating an example embodiment of process 3.100 of FIG. 3.1. More particularly, FIG. 3.8 illustrates a process 3.800 that includes the process 3.100, wherein the translating the utterance in the first language into a message in a second language includes operations performed by or at the following block(s).

At block 3.804, the process performs performing speech recognition, based on the speaker-related information, on the data representing the speech signal to convert the utterance in the first language into text representing the utterance in the first language. The speech recognition process may be improved, augmented, or otherwise adapted based on the speaker-related information. In one example, information about vocabulary frequently used by the speaker may be used to improve the performance of a speech recognizer.

At block 3.806, the process performs translating, based on the speaker-related information, the text representing the utterance in the first language into text representing the message in the second language. Translating from a first to a second language may also be improved, augmented, or otherwise adapted based on the speaker-related information. For example, when such a translation includes natural language processing to determine syntactic or semantic information about an utterance, such natural language processing may be improved with information about the speaker, such as idioms, expressions, or other language constructs frequently employed or otherwise correlated with the speaker.

FIG. 3.9 is an example flow diagram of example logic illustrating an example embodiment of process 3.800 of FIG. 3.8. More particularly, FIG. 3.9 illustrates a process 3.900 that includes the process 3.800, wherein the presenting the message in the second language includes operations performed by or at the following block(s).

At block 3.904, the process performs performing speech synthesis to convert the text representing the utterance in the second language into audio data representing the message in the second language.

At block 3.905, the process performs causing the audio data representing the message in the second language to be played to the user. The message may be played, for example, via an audio speaker of the hearing device 120.

FIG. 3.10 is an example flow diagram of example logic illustrating an example embodiment of process 3.800 of FIG. 3.8. More particularly, FIG. 3.10 illustrates a process 3.1000 that includes the process 3.800, wherein the performing speech recognition includes operations performed by or at the following block(s).

At block 3.1004, the process performs performing speech recognition based on cepstral coefficients that represent the speech signal. In other embodiments, other types of features or information may be also or instead used to perform speech recognition, including language models, dialect models, or the like.

FIG. 3.11 is an example flow diagram of example logic illustrating an example embodiment of process 3.800 of FIG. 3.8. More particularly, FIG. 3.11 illustrates a process 3.1100 that includes the process 3.800, wherein the performing speech recognition includes operations performed by or at the following block(s).

At block 3.1104, the process performs performing hidden Markov model-based speech recognition. Other approaches or techniques for speech recognition may include neural networks, stochastic modeling, or the like.

FIG. 3.12 is an example flow diagram of example logic illustrating an example embodiment of process 3.100 of FIG. 3.1. More particularly, FIG. 3.12 illustrates a process 3.1200 that includes the process 3.100, wherein the translating the utterance in the first language into a message in a second language includes operations performed by or at the following block(s).

At block 3.1204, the process performs translating the utterance based on speaker-related information including an identity of the speaker. The identity of the speaker may be used in various ways, such as to determine a speaker-specific vocabulary to use during speech recognition, natural language processing, machine translation, or the like.

FIG. 3.13 is an example flow diagram of example logic illustrating an example embodiment of process 3.100 of FIG. 3.1. More particularly, FIG. 3.13 illustrates a process 3.1300 that includes the process 3.100, wherein the translating the utterance in the first language into a message in a second language includes operations performed by or at the following block(s).

At block 3.1304, the process performs translating the utterance based on speaker-related information including a language model that is specific to the speaker. A speaker-specific language model may include or otherwise identify frequent words or patterns of words (e.g., n-grams) based on prior communications or other information about the speaker. Such a language model may be based on communications or other information generated by or about the speaker. Such a language model may be employed in the course of speech recognition, natural language processing, machine translation, or the like. Note that the language model need not be unique to the speaker, but may instead be specific to a class, type, or group of speakers that includes the speaker. For example, the language model may be tailored for speakers in a particular industry, from a particular region, or the like.

FIG. 3.14 is an example flow diagram of example logic illustrating an example embodiment of process 3.1300 of FIG. 3.13. More particularly, FIG. 3.14 illustrates a process 3.1400 that includes the process 3.1300, wherein the translating the utterance based on speaker-related information including a language model that is specific to the speaker includes operations performed by or at the following block(s).

At block 3.1404, the process performs translating the utterance based on a language model that is tailored to a group of people of which the speaker is a member. As noted, the language model need not be unique to the speaker. In some embodiments, the language model may be tuned to particular social classes, ethnic groups, countries, languages, or the like with which the speaker may be associated.

FIG. 3.15 is an example flow diagram of example logic illustrating an example embodiment of process 3.1300 of FIG. 3.13. More particularly, FIG. 3.15 illustrates a process 3.1500 that includes the process 3.1300, wherein the translating the utterance based on speaker-related information including a language model that is specific to the speaker includes operations performed by or at the following block(s).

At block 3.1504, the process performs generating the language model based on communications generated by the speaker. In some embodiments, the process mines or otherwise processes emails, text messages, voice messages, and the like to generate a language model that is specific or otherwise tailored to the speaker.

FIG. 3.16 is an example flow diagram of example logic illustrating an example embodiment of process 3.1500 of FIG. 3.15. More particularly, FIG. 3.16 illustrates a process 3.1600 that includes the process 3.1500, wherein the generating the language model based on communications generated by the speaker includes operations performed by or at the following block(s).

At block 3.1604, the process performs generating the language model based on emails transmitted by the speaker. In some embodiments, a corpus of emails may be processed to determine n-grams that represent likelihoods of various word transitions.

FIG. 3.17 is an example flow diagram of example logic illustrating an example embodiment of process 3.1500 of FIG. 3.15. More particularly, FIG. 3.17 illustrates a process 3.1700 that includes the process 3.1500, wherein the generating the language model based on communications generated by the speaker includes operations performed by or at the following block(s).

At block 3.1704, the process performs generating the language model based on documents authored by the speaker. In some embodiments, a corpus of documents may be processed to determine n-grams that represent likelihoods of various word transitions.

FIG. 3.18 is an example flow diagram of example logic illustrating an example embodiment of process 3.1500 of FIG. 3.15. More particularly, FIG. 3.18 illustrates a process 3.1800 that includes the process 3.1500, wherein the generating the language model based on communications generated by the speaker includes operations performed by or at the following block(s).

At block 3.1804, the process performs generating the language model based on social network messages transmitted by the speaker.

FIG. 3.19 is an example flow diagram of example logic illustrating an example embodiment of process 3.100 of FIG. 3.1. More particularly, FIG. 3.19 illustrates a process 3.1900 that includes the process 3.100, wherein the translating the utterance in the first language into a message in a second language includes operations performed by or at the following block(s).

At block 3.1904, the process performs translating the utterance based on speaker-related information including a speech model that is tailored to the speaker. A speech model tailored to the speaker (e.g., representing properties of the speech signal of the user) may be used to adapt or improve the performance of a speech recognizer. Note that the speech model need not be unique to the speaker, but may instead be specific to a class, type, or group of speakers that includes the speaker. For example, the speech model may be tailored for male speakers, female speakers, speakers from a particular country or region (e.g., to account for accents), or the like.

FIG. 3.20 is an example flow diagram of example logic illustrating an example embodiment of process 3.1900 of FIG. 3.19. More particularly, FIG. 3.20 illustrates a process 3.2000 that includes the process 3.1900, wherein the translating the utterance based on speaker-related information including a speech model that is tailored to the speaker includes operations performed by or at the following block(s).

At block 3.2004, the process performs translating the utterance based on a speech model that is tailored to a group of people of which the speaker is a member. As noted, the speech model need not be unique to the speaker. In some embodiments, the speech model may be tuned to particular genders, social classes, ethnic groups, countries, languages, or the like with which the speaker may be associated.

FIG. 3.21 is an example flow diagram of example logic illustrating an example embodiment of process 3.100 of FIG. 3.1. More particularly, FIG. 3.21 illustrates a process 3.2100 that includes the process 3.100, wherein the translating the utterance in the first language into a message in a second language includes operations performed by or at the following block(s).

At block 3.2104, the process performs translating the utterance based on speaker-related information including an information item that references the speaker. The information item may include a document, a message, a calendar event, a social networking relation, or the like. Various forms of information items are contemplated, including textual (e.g., emails, text messages, chats), audio (e.g., voice messages), video, or the like. In some embodiments, an information item may include content in multiple forms, such as text and audio, such as when an email includes a voice attachment.

FIG. 3.22 is an example flow diagram of example logic illustrating an example embodiment of process 3.100 of FIG. 3.1. More particularly, FIG. 3.22 illustrates a process 3.2200 that includes the process 3.100, wherein the translating the utterance in the first language into a message in a second language includes operations performed by or at the following block(s).

At block 3.2204, the process performs translating the utterance based on speaker-related information including a document that references the speaker. The document may be, for example, a report authored by the speaker.

FIG. 3.23 is an example flow diagram of example logic illustrating an example embodiment of process 3.100 of FIG. 3.1. More particularly, FIG. 3.23 illustrates a process 3.2300 that includes the process 3.100, wherein the translating the utterance in the first language into a message in a second language includes operations performed by or at the following block(s).

At block 3.2304, the process performs translating the utterance based on speaker-related information including a message that references the speaker. The message may be an email, text message, social network status update or other communication that is sent by the speaker, sent to the speaker, or references the speaker in some other way.

FIG. 3.24 is an example flow diagram of example logic illustrating an example embodiment of process 3.100 of FIG. 3.1. More particularly, FIG. 3.24 illustrates a process 3.2400 that includes the process 3.100, wherein the translating the utterance in the first language into a message in a second language includes operations performed by or at the following block(s).

At block 3.2404, the process performs translating the utterance based on speaker-related information including a calendar event that references the speaker. The calendar event may represent a past or future event to which the speaker was invited. An event may be any occurrence that involves or involved the user and/or the speaker, such as a meeting (e.g., social or professional meeting or gathering) attended by the user and the speaker, an upcoming deadline (e.g., for a project), or the like.

FIG. 3.25 is an example flow diagram of example logic illustrating an example embodiment of process 3.100 of FIG. 3.1. More particularly, FIG. 3.25 illustrates a process 3.2500 that includes the process 3.100, wherein the translating the utterance in the first language into a message in a second language includes operations performed by or at the following block(s).

At block 3.2504, the process performs translating the utterance based on speaker-related information including an indication of gender of the speaker. Information about the gender of the speaker may be used to customize or otherwise adapt a speech or language model that may be used during machine translation.

FIG. 3.26 is an example flow diagram of example logic illustrating an example embodiment of process 3.100 of FIG. 3.1. More particularly, FIG. 3.26 illustrates a process 3.2600 that includes the process 3.100, wherein the translating the utterance in the first language into a message in a second language includes operations performed by or at the following block(s).

At block 3.2604, the process performs translating the utterance based on speaker-related information including an organization to which the speaker belongs. The process may exploit an understanding of an organization to which the speaker belongs when performing natural language processing on the utterance. For example, the identity of a company that employs the speaker can be used to determine the meaning of industry-specific vocabulary in the utterance of the speaker. The organization may include a business, company (e.g., profit or non-profit), group, school, club, team, company, or other formal or informal organization with which the speaker is affiliated.

FIG. 3.27 is an example flow diagram of example logic illustrating an example embodiment of process 3.100 of FIG. 3.1. More particularly, FIG. 3.27 illustrates a process 3.2700 that includes the process 3.100, wherein the determining speaker-related information includes operations performed by or at the following block(s).

At block 3.2704, the process performs performing speech recognition to convert the received data into text data. For example, the process may convert the received data into a sequence of words that are (or are likely to be) the words uttered by the speaker.

At block 3.2706, the process performs determining the speaker-related information based on the text data. Given text data (e.g., words spoken by the speaker), the process may search for information items that include the text data, and then identify the speaker or determine other speaker-related information based on those information items, as discussed further below.

FIG. 3.28 is an example flow diagram of example logic illustrating an example embodiment of process 3.2700 of FIG. 3.27. More particularly, FIG. 3.28 illustrates a process 3.2800 that includes the process 3.2700, wherein the determining the speaker-related information based on the text data includes operations performed by or at the following block(s).

At block 3.2804, the process performs finding a document that references the speaker and that includes one or more words in the text data. In some embodiments, the process may search for and find a document or other item that includes words spoken by speaker. Then, the process can infer that the speaker is the author of the document, a recipient of the document, a person described in the document, or the like.

FIG. 3.29 is an example flow diagram of example logic illustrating an example embodiment of process 3.2700 of FIG. 3.27. More particularly, FIG. 3.29 illustrates a process 3.2900 that includes the process 3.2700 and which further includes operations performed by or at the following block(s).

At block 3.2904, the process performs retrieving information items that reference the text data. The process may here retrieve or otherwise obtain documents, calendar events, messages, or the like, that include, contain, or otherwise reference some portion of the text data.

FIG. 3.30 is an example flow diagram of example logic illustrating an example embodiment of process 3.100 of FIG. 3.1. More particularly, FIG. 3.30 illustrates a process 3.3000 that includes the process 3.100, wherein the determining speaker-related information includes operations performed by or at the following block(s).

At block 3.3004, the process performs accessing information items associated with the speaker. In some embodiments, accessing information items associated with the speaker may include retrieving files, documents, data records, or the like from various sources, such as local or remote storage devices, including cloud-based servers, and the like. In some embodiments, accessing information items may also or instead include scanning, searching, indexing, or otherwise processing information items to find ones that include, name, mention, or otherwise reference the speaker.

FIG. 3.31 is an example flow diagram of example logic illustrating an example embodiment of process 3.3000 of FIG. 3.30. More particularly, FIG. 3.31 illustrates a process 3.3100 that includes the process 3.3000, wherein the accessing information items associated with the speaker includes operations performed by or at the following block(s).

At block 3.3104, the process performs searching for information items that reference the speaker. In some embodiments, searching may include formulating a search query to provide to a document management system or any other data/document store that provides a search interface.

FIG. 3.32 is an example flow diagram of example logic illustrating an example embodiment of process 3.3000 of FIG. 3.30. More particularly, FIG. 3.32 illustrates a process 3.3200 that includes the process 3.3000, wherein the accessing information items associated with the speaker includes operations performed by or at the following block(s).

At block 3.3204, the process performs searching stored emails to find emails that reference the speaker. In some embodiments, emails that reference the speaker may include emails sent from the speaker, emails sent to the speaker, emails that name or otherwise identify the speaker in the body of an email, or the like.

FIG. 3.33 is an example flow diagram of example logic illustrating an example embodiment of process 3.3000 of FIG. 3.30. More particularly, FIG. 3.33 illustrates a process 3.3300 that includes the process 3.3000, wherein the accessing information items associated with the speaker includes operations performed by or at the following block(s).

At block 3.3304, the process performs searching stored text messages to find text messages that reference the speaker. In some embodiments, text messages that reference the speaker include messages sent to/from the speaker, messages that name or otherwise identify the speaker in a message body, or the like.

FIG. 3.34 is an example flow diagram of example logic illustrating an example embodiment of process 3.3000 of FIG. 3.30. More particularly, FIG. 3.34 illustrates a process 3.3400 that includes the process 3.3000, wherein the accessing information items associated with the speaker includes operations performed by or at the following block(s).

At block 3.3404, the process performs accessing a social networking service to find messages or status updates that reference the speaker. In some embodiments, accessing a social networking service may include searching for postings, status updates, personal messages, or the like that have been posted by, posted to, or otherwise reference the speaker. Example social networking services include Facebook, Twitter, Google Plus, and the like. Access to a social networking service may be obtained via an API or similar interface that provides access to social networking data related to the user and/or the speaker.

FIG. 3.35 is an example flow diagram of example logic illustrating an example embodiment of process 3.3000 of FIG. 3.30. More particularly, FIG. 3.35 illustrates a process 3.3500 that includes the process 3.3000, wherein the accessing information items associated with the speaker includes operations performed by or at the following block(s).

At block 3.3504, the process performs accessing a calendar to find information about appointments with the speaker. In some embodiments, accessing a calendar may include searching a private or shared calendar to locate a meeting or other appointment with the speaker, and providing such information to the user via the hearing device.

FIG. 3.36 is an example flow diagram of example logic illustrating an example embodiment of process 3.3000 of FIG. 3.30. More particularly, FIG. 3.36 illustrates a process 3.3600 that includes the process 3.3000, wherein the accessing information items associated with the speaker includes operations performed by or at the following block(s).

At block 3.3604, the process performs accessing a document store to find documents that reference the speaker. In some embodiments, documents that reference the speaker include those that are authored at least in part by the speaker, those that name or otherwise identify the speaker in a document body, or the like. Accessing the document store may include accessing a local or remote storage device/system, accessing a document management system, accessing a source control system, or the like.

FIG. 3.37 is an example flow diagram of example logic illustrating an example embodiment of process 3.100 of FIG. 3.1. More particularly, FIG. 3.37 illustrates a process 3.3700 that includes the process 3.100, wherein the determining speaker-related information includes operations performed by or at the following block(s).

At block 3.3704, the process performs performing voice identification based on the received data to identify the speaker. In some embodiments, voice identification may include generating a voice print, voice model, or other biometric feature set that characterizes the voice of the speaker, and then comparing the generated voice print to previously generated voice prints.

FIG. 3.38 is an example flow diagram of example logic illustrating an example embodiment of process 3.3700 of FIG. 3.37. More particularly, FIG. 3.38 illustrates a process 3.3800 that includes the process 3.3700, wherein the performing voice identification includes operations performed by or at the following block(s).

At block 3.3804, the process performs comparing properties of the speech signal with properties of previously recorded speech signals from multiple distinct speakers. In some embodiments, the process accesses voice prints associated with multiple speakers, and determines a best match against the speech signal.

FIG. 3.39 is an example flow diagram of example logic illustrating an example embodiment of process 3.3800 of FIG. 3.38. More particularly, FIG. 3.39 illustrates a process 3.3900 that includes the process 3.3800 and which further includes operations performed by or at the following block(s).

At block 3.3904, the process performs processing voice messages from the multiple distinct speakers to generate voice print data for each of the multiple distinct speakers. Given a telephone voice message, the process may associate generated voice print data for the voice message with one or more (direct or indirect) identifiers corresponding with the message. For example, the message may have a sender telephone number associated with it, and the process can use that sender telephone number to do a reverse directory lookup (e.g., in a public directory, in a personal contact list) to determine the name of the voice message speaker.

FIG. 3.40 is an example flow diagram of example logic illustrating an example embodiment of process 3.3700 of FIG. 3.37. More particularly, FIG. 3.40 illustrates a process 3.4000 that includes the process 3.3700, wherein the performing voice identification includes operations performed by or at the following block(s).

At block 3.4004, the process performs processing telephone voice messages stored by a voice mail service. In some embodiments, the process analyzes voice messages to generate voice prints/models for multiple speakers.

FIG. 3.41 is an example flow diagram of example logic illustrating an example embodiment of process 3.3700 of FIG. 3.37. More particularly, FIG. 3.41 illustrates a process 3.4100 that includes the process 3.3700 and which further includes operations performed by or at the following block(s).

At block 3.4104, the process performs determining that the speaker cannot be identified. In some embodiments, the process may determine that the speaker cannot be identified, for example because the speaker has not been previously identified, enrolled, or otherwise encountered. In some cases, the process may be unable to identify the speaker due to signal quality, environmental conditions, or the like.

FIG. 3.42 is an example flow diagram of example logic illustrating an example embodiment of process 3.4100 of FIG. 3.41. More particularly, FIG. 3.42 illustrates a process 3.4200 that includes the process 3.4100 and which further includes operations performed by or at the following block(s).

At block 3.4204, the process performs when it is determined that the speaker cannot be identified, storing the received data for system training. In some embodiments, the received data may be stored when the speaker cannot be identified, so that the system can be trained or otherwise configured to identify the speaker at a later time.

FIG. 3.43 is an example flow diagram of example logic illustrating an example embodiment of process 3.4100 of FIG. 3.41. More particularly, FIG. 3.43 illustrates a process 3.4300 that includes the process 3.4100 and which further includes operations performed by or at the following block(s).

At block 3.4304, the process performs when it is determined that the speaker cannot be identified, notifying the user. In some embodiments, the user may be notified that the process cannot identify the speaker, such as by playing a tone, voice feedback, or displaying a message. The user may in response manually identify the speaker or otherwise provide speaker-related information (e.g., the language spoken by the speaker) so that the process can perform translation or other functions.

FIG. 3.44 is an example flow diagram of example logic illustrating an example embodiment of process 3.100 of FIG. 3.1. More particularly, FIG. 3.44 illustrates a process 3.4400 that includes the process 3.100 and which further includes operations performed by or at the following block(s).

At block 3.4404, the process performs receiving data representing a speech signal that represents an utterance of the user. A microphone on or about the hearing device may capture this data. The microphone may be the same or different from one used to capture speech data from the speaker.

At block 3.4406, the process performs determining the speaker-related information based on the data representing a speech signal that represents an utterance of the user. Identifying the speaker in this manner may include performing speech recognition on the user's utterance, and then processing the resulting text data to locate a name. This identification can then be utilized to retrieve information items or other speaker-related information that may be useful to present to the user.

FIG. 3.45 is an example flow diagram of example logic illustrating an example embodiment of process 3.4400 of FIG. 3.44. More particularly, FIG. 3.45 illustrates a process 3.4500 that includes the process 3.4400, wherein the determining the speaker-related information based on the data representing a speech signal that represents an utterance of the user includes operations performed by or at the following block(s).

At block 3.4504, the process performs determining whether the utterance of the user includes a name of the speaker.

FIG. 3.46 is an example flow diagram of example logic illustrating an example embodiment of process 3.100 of FIG. 3.1. More particularly, FIG. 3.46 illustrates a process 3.4600 that includes the process 3.100, wherein the determining speaker-related information includes operations performed by or at the following block(s).

At block 3.4604, the process performs receiving context information related to the user. Context information may generally include information about the setting, location, occupation, communication, workflow, or other event or factor that is present at, about, or with respect to the user.

At block 3.4606, the process performs determining speaker-related information, based on the context information. Context information may be used to improve or enhance speaker identification, such as by determining or narrowing a set of potential speakers based on the current location of the user.

FIG. 3.47 is an example flow diagram of example logic illustrating an example embodiment of process 3.4600 of FIG. 3.46. More particularly, FIG. 3.47 illustrates a process 3.4700 that includes the process 3.4600, wherein the receiving context information related to the user includes operations performed by or at the following block(s).

At block 3.4704, the process performs receiving an indication of a location of the user.

At block 3.4706, the process performs determining a plurality of persons with whom the user commonly interacts at the location. For example, if the indicated location is a workplace, the process may generate a list of co-workers, thereby reducing or simplifying the problem of speaker identification.

FIG. 3.48 is an example flow diagram of example logic illustrating an example embodiment of process 3.4700 of FIG. 3.47. More particularly, FIG. 3.48 illustrates a process 3.4800 that includes the process 3.4700, wherein the receiving an indication of a location of the user includes operations performed by or at the following block(s).

At block 3.4804, the process performs receiving a GPS location from a mobile device of the user.

FIG. 3.49 is an example flow diagram of example logic illustrating an example embodiment of process 3.4700 of FIG. 3.47. More particularly, FIG. 3.49 illustrates a process 3.4900 that includes the process 3.4700, wherein the receiving an indication of a location of the user includes operations performed by or at the following block(s).

At block 3.4904, the process performs receiving a network identifier that is associated with the location. The network identifier may be, for example, a service set identifier ("SSID") of a wireless network with which the user is currently associated.

FIG. 3.50 is an example flow diagram of example logic illustrating an example embodiment of process 3.4700 of FIG. 3.47. More particularly, FIG. 3.50 illustrates a process 3.5000 that includes the process 3.4700, wherein the receiving an indication of a location of the user includes operations performed by or at the following block(s).

At block 3.5004, the process performs receiving an indication that the user is at a workplace or a residence. For example, the process may translate a coordinate-based location (e.g., GPS coordinates) to a particular workplace by performing a map lookup or other mechanism.

FIG. 3.51 is an example flow diagram of example logic illustrating an example embodiment of process 3.4600 of FIG. 3.46. More particularly, FIG. 3.51 illustrates a process 3.5100 that includes the process 3.4600, wherein the receiving context information related to the user includes operations performed by or at the following block(s).

At block 3.5104, the process performs receiving information about a communication that references the speaker. As noted, context information may include communications. In this case, the process may exploit such communications to improve speaker identification or other operations.

FIG. 3.52 is an example flow diagram of example logic illustrating an example embodiment of process 3.5100 of FIG. 3.51. More particularly, FIG. 3.52 illustrates a process 3.5200 that includes the process 3.5100, wherein the receiving information about a communication that references the speaker includes operations performed by or at the following block(s).

At block 3.5204, the process performs receiving information about a message and/or a document that references the speaker.

FIG. 3.53 is an example flow diagram of example logic illustrating an example embodiment of process 3.100 of FIG. 3.1. More particularly, FIG. 3.53 illustrates a process 3.5300 that includes the process 3.100, wherein the determining speaker-related information includes operations performed by or at the following block(s).

At block 3.5304, the process performs identifying a plurality of candidate speakers. In some embodiments, more than one candidate speaker may be identified, such as by a voice identification process that returns multiple candidate speakers along with associated likelihoods and/or due to ambiguity or uncertainty regarding who is speaking.

At block 3.5305, the process performs presenting indications of the plurality of candidate speakers. The process may display or tell the user about the candidate speakers so that the user can select which one (if any) is the actual speaker.

FIG. 3.54 is an example flow diagram of example logic illustrating an example embodiment of process 3.5300 of FIG. 3.53.

At block 3.5402, the process performs receiving from the user a selection of one of the plurality of candidate speakers that is the speaker. The user may indicate, such as via a user interface input, a gesture, a spoken command, or the like, which of the plurality of candidate speakers is the actual speaker.

At block 3.5403, the process performs determining the speaker-related information based on the selection received from the user.

FIG. 3.55 is an example flow diagram of example logic illustrating an example embodiment of process 3.5300 of FIG. 3.53.

At block 3.5502, the process performs receiving from the user an indication that none of the plurality of candidate speakers are the speaker. The user may indicate, such as via a user interface input, a gesture, a spoken command, or the like, that he does not recognize any of the candidate speakers as the actual speaker.

At block 3.5503, the process performs training a speaker identification system based on the received indication. The received indication may in turn be used to train or otherwise improve performance of a speaker identification or recognition system.

FIG. 3.56 is an example flow diagram of example logic illustrating an example embodiment of process 3.5300 of FIG. 3.53.

At block 3.5602, the process performs training a speaker identification system based on a selection regarding the plurality of candidate speakers received from a user. An selection regarding which speaker is the actual speaker (or that the actual speaker is not recognized amongst the candidate speakers) may be used to train or otherwise improve performance of a speaker identification or recognition system.

FIG. 3.57 is an example flow diagram of example logic illustrating an example embodiment of process 3.100 of FIG. 3.1. More particularly, FIG. 3.57 illustrates a process 3.5700 that includes the process 3.100 and which further includes operations performed by or at the following block(s).

At block 3.5704, the process performs developing a corpus of speaker data by recording speech from a plurality of speakers.

At block 3.5705, the process performs determining the speaker-related information and/or translating the utterance based at least in part on the corpus of speaker data. Over time, the process may gather and record speech obtained during its operation, and then use that speech as part of a corpus that is used during future operation. In this manner, the process may improve its performance by utilizing actual, environmental speech data, possibly along with feedback received from the user, as discussed below.

FIG. 3.58 is an example flow diagram of example logic illustrating an example embodiment of process 3.5700 of FIG. 3.57. More particularly, FIG. 3.58 illustrates a process 3.5800 that includes the process 3.5700 and which further includes operations performed by or at the following block(s).

At block 3.5804, the process performs generating a speech model associated with each of the plurality of speakers, based on the recorded speech. The generated speech model may include voice print data that can be used for speaker identification, a language model that may be used for speech recognition purposes, a noise model that may be used to improve operation in speaker-specific noisy environments.

FIG. 3.59 is an example flow diagram of example logic illustrating an example embodiment of process 3.5700 of FIG. 3.57. More particularly, FIG. 3.59 illustrates a process 3.5900 that includes the process 3.5700 and which further includes operations performed by or at the following block(s).

At block 3.5904, the process performs receiving feedback regarding accuracy of the speaker-related information. During or after providing speaker-related information to the user, the user may provide feedback regarding its accuracy. This feedback may then be used to train a speech processor (e.g., a speaker identification module, a speech recognition module). Feedback may be provided in various ways, such as by processing positive/negative utterances from the speaker (e.g., "That is not my name"), receiving a positive/negative utterance from the user (e.g., "I am sorry."), receiving a keyboard/button event that indicates a correct or incorrect identification.

At block 3.5905, the process performs training a speech processor based at least in part on the received feedback.

FIG. 3.60 is an example flow diagram of example logic illustrating an example embodiment of process 3.100 of FIG. 3.1. More particularly, FIG. 3.60 illustrates a process 3.6000 that includes the process 3.100, wherein the presenting the message in the second language includes operations performed by or at the following block(s).

At block 3.6004, the process performs transmitting the message in the second language from a first device to a second device. In some embodiments, at least some of the processing may be performed on distinct devices, resulting in a transmission of the translated utterance from one device to another device.

FIG. 3.61 is an example flow diagram of example logic illustrating an example embodiment of process 3.6000 of FIG. 3.60. More particularly, FIG. 3.61 illustrates a process 3.6100 that includes the process 3.6000, wherein the transmitting the message in the second language from a first device to a second device includes operations performed by or at the following block(s).

At block 3.6104, the process performs wirelessly transmitting the message in the second language. Various protocols may be used, including Bluetooth, infrared, WiFi, or the like.

FIG. 3.62 is an example flow diagram of example logic illustrating an example embodiment of process 3.6000 of FIG. 3.60. More particularly, FIG. 3.62 illustrates a process 3.6200 that includes the process 3.6000, wherein the transmitting the message in the second language from a first device to a second device includes operations performed by or at the following block(s).

At block 3.6204, the process performs transmitting the message in the second language from a smart phone or portable media device to the second device. For example a smart phone may forward the translated utterance to a desktop computing system for display on an associated monitor.

FIG. 3.63 is an example flow diagram of example logic illustrating an example embodiment of process 3.6000 of FIG. 3.60. More particularly, FIG. 3.63 illustrates a process 3.6300 that includes the process 3.6000, wherein the transmitting the message in the second language from a first device to a second device includes operations performed by or at the following block(s).

At block 3.6304, the process performs transmitting the message in the second language from a server system to the second device. In some embodiments, some portion of the processing is performed on a server system that may be remote from the hearing device or the second device.

FIG. 3.64 is an example flow diagram of example logic illustrating an example embodiment of process 3.6300 of FIG. 3.63. More particularly, FIG. 3.64 illustrates a process 3.6400 that includes the process 3.6300, wherein the transmitting the message in the second language from a server system includes operations performed by or at the following block(s).

At block 3.6404, the process performs transmitting the message in the second language from a server system that resides in a data center.

FIG. 3.65 is an example flow diagram of example logic illustrating an example embodiment of process 3.6300 of FIG. 3.63. More particularly, FIG. 3.65 illustrates a process 3.6500 that includes the process 3.6300, wherein the transmitting the message in the second language from a server system includes operations performed by or at the following block(s).

At block 3.6504, the process performs transmitting the message in the second language from a server system to a desktop computer of the user.

FIG. 3.66 is an example flow diagram of example logic illustrating an example embodiment of process 3.6300 of FIG. 3.63. More particularly, FIG. 3.66 illustrates a process 3.6600 that includes the process 3.6300, wherein the transmitting the message in the second language from a server system includes operations performed by or at the following block(s).

At block 3.6604, the process performs transmitting the message in the second language from a server system to a mobile device of the user.

FIG. 3.67 is an example flow diagram of example logic illustrating an example embodiment of process 3.100 of FIG. 3.1. More particularly, FIG. 3.67 illustrates a process 3.6700 that includes the process 3.100 and which further includes operations performed by or at the following block(s).

At block 3.6704, the process performs performing the receiving data representing a speech signal, the determining speaker-related information, the translating the utterance in the first language into a message in a second language, and/or the presenting the message in the second language on a mobile device that is operated by the user. As noted, In some embodiments a mobile device such as a smart phone or media player may have sufficient processing power to perform a portion of the process, such as identifying the speaker, determining the speaker-related information, or the like.

FIG. 3.68 is an example flow diagram of example logic illustrating an example embodiment of process 3.100 of FIG. 3.1. More particularly, FIG. 3.68 illustrates a process 3.6800 that includes the process 3.100 and which further includes operations performed by or at the following block(s).

At block 3.6804, the process performs performing the receiving data representing a speech signal, the determining speaker-related information, the translating the utterance in the first language into a message in a second language, and/or the presenting the message in the second language on a desktop computer that is operated by the user. For example, in an office setting, the user's desktop computer may be configured to perform some or all of the process.

FIG. 3.69 is an example flow diagram of example logic illustrating an example embodiment of process 3.100 of FIG. 3.1. More particularly, FIG. 3.69 illustrates a process 3.6900 that includes the process 3.100 and which further includes operations performed by or at the following block(s).

At block 3.6904, the process performs determining to perform at least some of determining speaker-related information or translating the utterance in the first language into a message in a second language on another computing device that has available processing capacity. In some embodiments, the process may determine to offload some of its processing to another computing device or system.

FIG. 3.70 is an example flow diagram of example logic illustrating an example embodiment of process 3.6900 of FIG. 3.69. More particularly, FIG. 3.70 illustrates a process 3.7000 that includes the process 3.6900 and which further includes operations performed by or at the following block(s).

At block 3.7004, the process performs receiving at least some of speaker-related information from the another computing device. The process may receive the speaker-related information or a portion thereof from the other computing device.

FIG. 3.71 is an example flow diagram of example logic illustrating an example embodiment of process 3.100 of FIG. 3.1. More particularly, FIG. 3.71 illustrates a process 3.7100 that includes the process 3.100 and which further includes operations performed by or at the following block(s).

At block 3.7104, the process performs informing the user of the speaker-related information. The process may also inform the user of the speaker-related information, so that the user can utilize the information in his conversation with the speaker, or for other reasons.

FIG. 3.72 is an example flow diagram of example logic illustrating an example embodiment of process 3.7100 of FIG. 3.71. More particularly, FIG. 3.72 illustrates a process 3.7200 that includes the process 3.7100 and which further includes operations performed by or at the following block(s).

At block 3.7204, the process performs receiving feedback from the user regarding correctness of the speaker-related information. The speaker may notify the process when the speaker-related information is incorrect or inaccurate, such as when the process has misidentified the speaker's language or name.

At block 3.7205, the process performs refining the speaker-related information based on the received feedback. The received feedback may be used to train or otherwise improve the performance of the AEFS.

FIG. 3.73 is an example flow diagram of example logic illustrating an example embodiment of process 3.7200 of FIG. 3.72. More particularly, FIG. 3.73 illustrates a process 3.7300 that includes the process 3.7200, wherein the refining the speaker-related information based on the received feedback includes operations performed by or at the following block(s).

At block 3.7304, the process performs presenting speaker-related information corresponding to each of multiple likely speakers.

At block 3.7305, the process performs receiving from the user an indication that the speaker is one of the multiple likely speakers.

FIG. 3.74 is an example flow diagram of example logic illustrating an example embodiment of process 3.7100 of FIG. 3.71. More particularly, FIG. 3.74 illustrates a process 3.7400 that includes the process 3.7100, wherein the informing the user of the speaker-related information includes operations performed by or at the following block(s).

At block 3.7404, the process performs presenting the speaker-related information on a display of the hearing device. In some embodiments, the hearing device may include a display. For example, where the hearing device is a smart phone or media device, the hearing device may include a display that provides a suitable medium for presenting the name or other identifier of the speaker.

FIG. 3.75 is an example flow diagram of example logic illustrating an example embodiment of process 3.7100 of FIG. 3.71. More particularly, FIG. 3.75 illustrates a process 3.7500 that includes the process 3.7100, wherein the informing the user of the speaker-related information includes operations performed by or at the following block(s).

At block 3.7504, the process performs presenting the speaker-related information on a display of a computing device that is distinct from the hearing device. In some embodiments, the hearing device may not itself include a display. For example, where the hearing device is a office phone, the process may elect to present the speaker-related information on a display of a nearby computing device, such as a desktop or laptop computer in the vicinity of the phone.

FIG. 3.76 is an example flow diagram of example logic illustrating an example embodiment of process 3.7100 of FIG. 3.71. More particularly, FIG. 3.76 illustrates a process 3.7600 that includes the process 3.7100, wherein the informing the user of the speaker-related information includes operations performed by or at the following block(s).

At block 3.7604, the process performs audibly informing the user to view the speaker-related information on a display device.

FIG. 3.77 is an example flow diagram of example logic illustrating an example embodiment of process 3.7600 of FIG. 3.76. More particularly, FIG. 3.77 illustrates a process 3.7700 that includes the process 3.7600, wherein the audibly informing the user includes operations performed by or at the following block(s).

At block 3.7704, the process performs playing a tone via an audio speaker of the hearing device. The tone may include a beep, chime, or other type of notification.

FIG. 3.78 is an example flow diagram of example logic illustrating an example embodiment of process 3.7600 of FIG. 3.76. More particularly, FIG. 3.78 illustrates a process 3.7800 that includes the process 3.7600, wherein the audibly informing the user includes operations performed by or at the following block(s).

At block 3.7804, the process performs playing synthesized speech via an audio speaker of the hearing device, the synthesized speech telling the user to view the display device. In some embodiments, the process may perform text-to-speech processing to generate audio of a textual message or notification, and this audio may then be played or otherwise output to the user via the hearing device.

FIG. 3.79 is an example flow diagram of example logic illustrating an example embodiment of process 3.7600 of FIG. 3.76. More particularly, FIG. 3.79 illustrates a process 3.7900 that includes the process 3.7600, wherein the audibly informing the user includes operations performed by or at the following block(s).

At block 3.7904, the process performs telling the user that at least one of a document, a calendar event, and/or a communication is available for viewing on the display device. Telling the user about a document or other speaker-related information may include playing synthesized speech that includes an utterance to that effect.

FIG. 3.80 is an example flow diagram of example logic illustrating an example embodiment of process 3.7600 of FIG. 3.76. More particularly, FIG. 3.80 illustrates a process 3.8000 that includes the process 3.7600, wherein the audibly informing the user includes operations performed by or at the following block(s).

At block 3.8004, the process performs audibly informing the user in a manner that is not audible to the speaker. For example, a tone or verbal message may be output via an earpiece speaker, such that other parties to the conversation (including the speaker) do not hear the notification. As another example, a tone or other notification may be into the earpiece of a telephone, such as when the process is performing its functions within the context of a telephonic conference call.

3. Example Computing System Implementation

Figure 4:
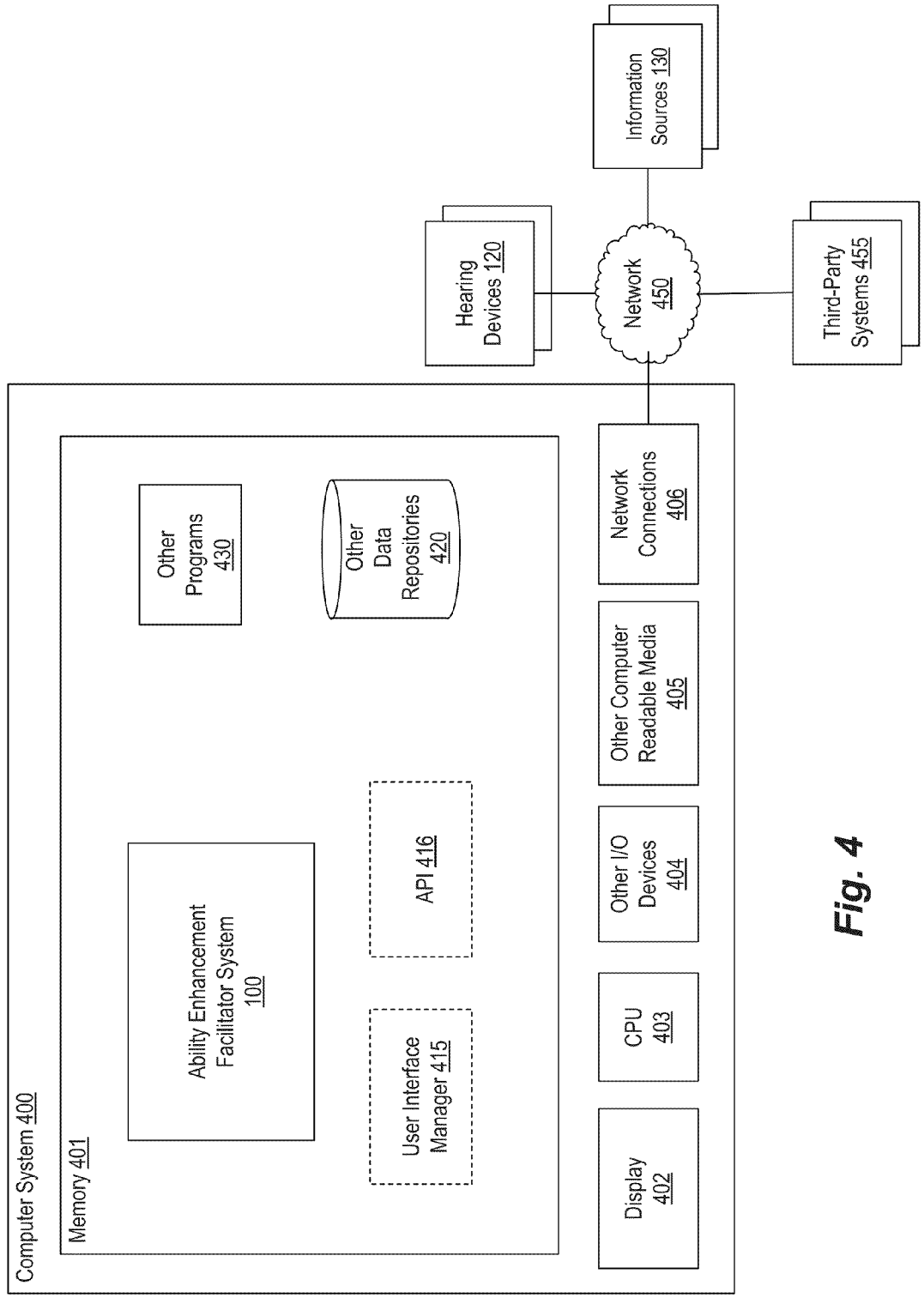
FIG. 4 is an example block diagram of an example computing system for implementing an ability enhancement facilitator system according to an example embodiment.

FIG. 4 is an example block diagram of an example computing system for implementing an ability enhancement facilitator system according to an example embodiment. In particular, FIG. 4 shows a computing system 400 that may be utilized to implement an AEFS 100.

Note that one or more general purpose or special purpose computing systems/devices may be used to implement the AEFS 100. In addition, the computing system 400 may comprise one or more distinct computing systems/devices and may span distributed locations. Furthermore, each block shown may represent one or more such blocks as appropriate to a specific embodiment or may be combined with other blocks. Also, the AEFS 100 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406. The AEFS 100 is shown residing in memory 401. In other embodiments, some portion of the contents, some or all of the components of the AEFS 100 may be stored on and/or transmitted over the other computer-readable media 405. The components of the AEFS 100 preferably execute on one or more CPUs 403 and recommend content items, as described herein. Other code or programs 430 (e.g., an administrative interface, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405 or a display 402.

The AEFS 100 interacts via the network 450 with hearing devices 120, speaker-related information sources 130, and third-party systems/applications 455. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 455 may include any systems that provide data to, or utilize data from, the AEFS 100, including Web browsers, e-commerce sites, calendar applications, email systems, social networking services, and the like.

The AEFS 100 is shown executing in the memory 401 of the computing system 400. Also included in the memory are a user interface manager 415 and an application program interface ("API") 416. The user interface manager 415 and the API 416 are drawn in dashed lines to indicate that in other embodiments, functions performed by one or more of these components may be performed externally to the AEFS 100.

The UI manager 415 provides a view and a controller that facilitate user interaction with the AEFS 100 and its various components. For example, the UI manager 415 may provide interactive access to the AEFS 100, such that users can configure the operation of the AEFS 100, such as by providing the AEFS 100 credentials to access various sources of speaker-related information, including social networking services, email systems, document stores, or the like. In some embodiments, access to the functionality of the UI manager 415 may be provided via a Web server, possibly executing as one of the other programs 430. In such embodiments, a user operating a Web browser executing on one of the third-party systems 455 can interact with the AEFS 100 via the UI manager 415.

The API 416 provides programmatic access to one or more functions of the AEFS 100. For example, the API 416 may provide a programmatic interface to one or more functions of the AEFS 100 that may be invoked by one of the other programs 430 or some other module. In this manner, the API 416 facilitates the development of third-party software, such as user interfaces, plug-ins, adapters (e.g., for integrating functions of the AEFS 100 into Web applications), and the like.

In addition, the API 416 may be in at least some embodiments invoked or otherwise accessed via remote entities, such as code executing on one of the hearing devices 120, information sources 130, and/or one of the third-party systems/applications 455, to access various functions of the AEFS 100. For example, an information source 130 may push speaker-related information (e.g., emails, documents, calendar events) to the AEFS 100 via the API 416. The API 416 may also be configured to provide management widgets (e.g., code modules) that can be integrated into the third-party applications 455 and that are configured to interact with the AEFS 100 to make at least some of the described functionality available within the context of other applications (e.g., mobile apps).

In an example embodiment, components/modules of the AEFS 100 are implemented using standard programming techniques. For example, the AEFS 100 may be implemented as a "native" executable running on the CPU 403, along with one or more static or dynamic libraries. In other embodiments, the AEFS 100 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AEFS 100, such as in the data store 420 (or 240), can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AEFS 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory;

a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for ability enhancement are applicable to other architectures or in other settings. For example, instead of providing assistance to users who are engaged in face-to-face conversation, at least some of the techniques may be employed in remote communication, such as telephony systems (e.g., POTS, Voice Over IP, conference calls), online voice chat systems, and the like. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for ability enhancement, the method comprising:
    receiving data representing a speech signal obtained at a hearing device associated with a user, the speech signal representing an utterance of a speaker in a first language;
    determining speaker-related information associated with the speaker, based on the data representing the speech signal;
    translating the utterance in the first language into a message in a second language, based on the speaker-related information;
    presenting the message in the second language; and
    distributing processing tasks among available computing resources including the hearing device, a computing device of the user and/or the speaker, and a remote computing system, by determining where to perform the processing tasks by identifying one of the computing resources that has available capacity, the processing tasks including determining speaker-related information and translating the utterance in the first language into a message in a second language.

2. The method of claim 1, wherein the determining speaker-related information includes: determining the first language.

3. The method of claim 2, wherein the determining the first language includes:
    concurrently processing the received data with multiple speech recognizers that are each configured to recognize speech in a different corresponding language; and
    selecting as the first language the language corresponding to a speech recognizer of the multiple speech recognizer that produces a result that has a higher confidence level than other of the multiple speech recognizers.

4. The method of claim 2, wherein the determining the first language includes: identifying signal characteristics in the received data that are correlated with the first language.

5. The method of claim 2, wherein the determining the first language includes:
    receiving an indication of a current location of the user;
    determining one or more languages that are commonly spoken at the current location; and
    selecting one of the one or more languages as the first language.

6. The method of claim 2, wherein the determining the first language includes:
    presenting indications of multiple languages to the user; and
    receiving from the user an indication of one of the multiple languages.

7. The method of claim 2, further comprising: selecting a speech recognizer configured to recognize speech in the first language.

8. The method of claim 1, wherein the translating the utterance in the first language into a message in a second language includes:
    performing speech recognition, based on the speaker-related information, on the data representing the speech signal to convert the utterance in the first language into text representing the utterance in the first language; and
    translating, based on the speaker-related information, the text representing the utterance in the first language into text representing the message in the second language.

9. The method of claim 8, wherein the presenting the message in the second language includes:
    performing speech synthesis to convert the text representing the utterance in the second language into audio data representing the message in the second language; and
    causing the audio data representing the message in the second language to be played to the user.

10. The method of claim 1, wherein the translating the utterance in the first language into a message in a second language includes: translating the utterance based on speaker-related information including an identity of the speaker.

11. The method of claim 1, wherein the translating the utterance in the first language into a message in a second language includes: translating the utterance based on speaker-related information including a language model that is specific to the speaker.

12. The method of claim 11, wherein the translating the utterance based on speaker-related information including a language model that is specific to the speaker includes: translating the utterance based on a language model that is tailored to a group of people of which the speaker is a member.

13. The method of claim 11, wherein the translating the utterance based on speaker-related information including a language model that is specific to the speaker includes: generating the language model based on communications generated by the speaker.

14. The method of claim 13, wherein the generating the language model based on communications generated by the speaker includes: generating the language model based on emails transmitted by the speaker.

15. The method of claim 13, wherein the generating the language model based on communications generated by the speaker includes: generating the language model based on documents authored by the speaker.

16. The method of claim 13, wherein the generating the language model based on communications generated by the speaker includes: generating the language model based on social network messages transmitted by the speaker.

17. The method of claim 1, wherein the translating the utterance in the first language into a message in a second language includes: translating the utterance based on speaker-related information including a speech model that is tailored to the speaker.

18. The method of claim 17, wherein the translating the utterance based on speaker-related information including a speech model that is tailored to the speaker includes: translating the utterance based on a speech model that is tailored to a group of people of which the speaker is a member.

19. The method of claim 1, wherein the translating the utterance in the first language into a message in a second language includes: translating the utterance based on speaker-related information including an information item that references the speaker.

20. The method of claim 1, wherein the translating the utterance in the first language into a message in a second language includes: translating the utterance based on speaker-related information including a document that references the speaker.

21. The method of claim 1, wherein the translating the utterance in the first language into a message in a second language includes: translating the utterance based on speaker-related information including a message that references the speaker.

22. The method of claim 1, wherein the translating the utterance in the first language into a message in a second language includes: translating the utterance based on speaker-related information including a calendar event that references the speaker.

23. The method of claim 1, wherein the translating the utterance in the first language into a message in a second language includes: translating the utterance based on speaker-related information including an indication of gender of the speaker.

24. The method of claim 1, wherein the translating the utterance in the first language into a message in a second language includes: translating the utterance based on speaker-related information including an organization to which the speaker belongs.

25. The method of claim 1, wherein the determining speaker-related information includes: performing voice identification based on the received data to identify the speaker.

26. The method of claim 25, further comprising: determining that the speaker cannot be identified.

27. The method of claim 26, further comprising: when it is determined that the speaker cannot be identified, storing the received data for system training.

28. The method of claim 26, further comprising: when it is determined that the speaker cannot be identified, notifying the user.

29. The method of claim 1, further comprising:
receiving data representing a speech signal that represents an utterance of the user; and
determining the speaker-related information based on the data representing a speech signal that represents an utterance of the user.

30. The method of claim 29, wherein the determining the speaker-related information based on the data representing a speech signal that represents an utterance of the user includes: determining whether the utterance of the user includes a name of the speaker.

31. The method of claim 1, wherein the determining speaker-related information includes:
identifying a plurality of candidate speakers; and
presenting indications of the plurality of candidate speakers.

32. The method of claim 31, further comprising:
receiving from the user a selection of one of the plurality of candidate speakers that is the speaker; and
determining the speaker-related information based on the selection received from the user.

33. The method of claim 31, further comprising:
receiving from the user an indication that none of the plurality of candidate speakers are the speaker; and
training a speaker identification system based on the received indication.

34. The method of claim 31, further comprising: training a speaker identification system based on a selection regarding the plurality of candidate speakers received from a user.

35. The method of claim 1, wherein the presenting the message in the second language includes: transmitting the message in the second language from a first device to a second device.

36. The method of claim 35, wherein the transmitting the message in the second language from a first device to a second device includes: transmitting the message in the second language from a smart phone or portable media device to the second device.

37. The method of claim 35, wherein the transmitting the message in the second language from a first device to a second device includes: transmitting the message in the second language from a server system to the second device.

38. The method of claim 37, wherein the transmitting the message in the second language from a server system includes: transmitting the message in the second language from a server system to a mobile device of the user.

39. The method of claim 1, further comprising: performing the receiving data representing a speech signal, the determining speaker-related information, the translating the utterance in the first language into a message in a second language, and/or the presenting the message in the second language on a mobile device that is operated by the user.

40. The method of claim 1, further comprising: performing the receiving data representing a speech signal, the determining speaker-related information, the translating the utterance in the first language into a message in a second language, and/or the presenting the message in the second language on a desktop computer that is operated by the user.

41. The method of claim 1, further comprising: receiving at least some of speaker-related information from the identified computing resource.

42. The method of claim 1, further comprising: informing the user of the speaker-related information.

43. The method of claim 42, further comprising:
receiving feedback from the user regarding correctness of the speaker-related information; and
refining the speaker-related information based on the received feedback.

44. The method of claim 43, wherein the refining the speaker-related information based on the received feedback includes:
presenting speaker-related information corresponding to each of multiple likely speakers; and receiving from the user an indication that the speaker is one of the multiple likely speakers.

45. The method of claim 42, wherein the informing the user of the speaker-related information includes: presenting the speaker-related information on a display of the hearing device.

46. The method of claim 42, wherein the informing the user of the speaker-related information includes: presenting the speaker-related information on a display of a computing device that is distinct from the hearing device.

47. A non-transitory computer-readable medium including instructions that are configured, when executed, to cause a computing system to perform a method for ability enhancement, the method comprising:
- receiving data representing a speech signal obtained at a hearing device associated with a user, the speech signal representing an utterance of a speaker in a first language;
- determining speaker-related information associated with the speaker, based on the data representing the speech signal;
- translating the utterance in the first language into a message in a second language, based on the speaker-related information;
- presenting the message in the second language; and
- distributing processing tasks among available computing resources including the hearing device, a computing device of the user and/or the speaker, and a remote computing system, by determining where to perform the processing tasks by identifying one of the computing resources that has available capacity, the processing tasks including determining speaker-related information and translating the utterance in the first language into a message in a second language.

48. A computing system for ability enhancement, the computing system comprising:
- a processor;
- a memory; and
- a module that is stored in the memory and that is configured, when executed by the processor, to perform a method comprising:
  - receiving data representing a speech signal obtained at a hearing device associated with a user, the speech signal representing an utterance of a speaker in a first language;
  - determining speaker-related information associated with the speaker, based on the data representing the speech signal;
  - translating the utterance in the first language into a message in a second language, based on the speaker-related information;
  - presenting the message in the second language; and
  - distributing processing tasks among available computing resources including the hearing device, a computing device of the user and/or the speaker, and a remote computing system, by determining where to perform the processing tasks by identifying one of the computing resources that has available capacity, the processing tasks including determining speaker-related information and translating the utterance in the first language into a message in a second language.

\* \* \* \* \*